US012224473B2

(12) United States Patent
Yukawa et al.

(10) Patent No.: US 12,224,473 B2
(45) Date of Patent: Feb. 11, 2025

(54) POLARIZED WAVEGUIDE FILTER AND ANTENNA FEEDING CIRCUIT

(71) Applicant: Mitsubishi Electric Corporation, Tokyo (JP)

(72) Inventors: Hidenori Yukawa, Tokyo (JP); Ryuya Seki, Tokyo (JP); Hiroto Ado, Tokyo (JP); Hiromasa Nakajima, Tokyo (JP); Yu Ushijima, Tokyo (JP); Toru Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 779 days.

(21) Appl. No.: 17/510,758

(22) Filed: Oct. 26, 2021

(65) Prior Publication Data

US 2022/0045412 A1 Feb. 10, 2022

Related U.S. Application Data

(63) Continuation of application No. PCT/JP2019/022030, filed on Jun. 3, 2019.

(51) Int. Cl.
*H01P 1/207* (2006.01)
*H01P 1/165* (2006.01)
(Continued)

(52) U.S. Cl.
CPC .............. *H01P 1/207* (2013.01); *H01P 1/165* (2013.01); *H01P 1/2082* (2013.01); *H01P 3/12* (2013.01)

(58) Field of Classification Search
CPC ........ H01P 1/207; H01P 1/165; H01P 1/2082; H01P 3/12
See application file for complete search history.

(56) References Cited

U.S. PATENT DOCUMENTS

| | | | | |
|---|---|---|---|---|
| 5,710,530 | A | 1/1998 | Wada et al. | |
| 7,283,022 | B2 * | 10/2007 | Andreasson | H01P 1/2086 333/219.1 |

(Continued)

FOREIGN PATENT DOCUMENTS

| | | | |
|---|---|---|---|
| CN | 109509950 A | 3/2019 | |
| JP | 7-142912 A | 6/1995 | |
| WO | WO 2017/163310 A1 | 9/2017 | |

OTHER PUBLICATIONS

Ding et al., "WR-3 Band Quasi-Elliptical Waveguide Filters Using Higher Order Mode Resonances", IEEE Transactions on Terahertz Science and Technology, May 2017, vol. 7, No. 3, p. 302-309.

(Continued)

*Primary Examiner* — Emily P Pham
(74) *Attorney, Agent, or Firm* — Birch, Stewart, Kolasch & Birch, LLP

(57) ABSTRACT

A polarized waveguide filter is formed in which the polarized waveguide filter includes a first rectangular waveguide; a second rectangular waveguide; and a rectangular cavity resonator that has a first edge surface connected to an electromagnetic wave exit plane of the first rectangular waveguide via a coupling unit, and has a second edge surface facing the first edge surface and connected to an electromagnetic wave incident plane of the second rectangular waveguide via a coupling unit, and excites each of a TE10 mode and a TE20 mode of an electromagnetic wave, and the rectangular cavity resonator has two first wall surfaces and two second wall surfaces narrower in area than the first wall surfaces, and a protrusion that shifts a resonance frequency of the TE10 mode and a resonance frequency of the TE20 mode by respective amounts different (Continued)

from each other is provided on at least one of the two first wall surfaces, in such a way as to protrude outward from the rectangular cavity resonator.

13 Claims, 17 Drawing Sheets

(51) Int. Cl.
*H01P 1/208* (2006.01)
*H01P 3/12* (2006.01)

(56) References Cited

U.S. PATENT DOCUMENTS

2009/0201106 A1 8/2009 Iio et al.
2019/0058233 A1 2/2019 Hirota et al.

OTHER PUBLICATIONS

German Office Action for German Application No. 11 2019 007 266.8, dated Feb. 5, 2024, with English translation.

* cited by examiner

POLARIZED WAVEGUIDE FILTER AND ANTENNA FEEDING CIRCUIT

CROSS REFERENCE TO RELATED APPLICATIONS

This application is a Continuation of PCT International Application No. PCT/JP2019/022030 filed on Jun. 3, 2019, which is hereby expressly incorporated by reference into the present application.

TECHNICAL FIELD

The invention relates to a polarized waveguide filter including rectangular waveguides and a rectangular cavity resonator, and an antenna feeding circuit.

BACKGROUND ART

An antenna feeding circuit for satellite communication, etc., may use a polarized waveguide filter to allow a signal in one frequency band out of signals in two frequency bands to pass through, and attenuate a signal in the other frequency band.

The following Non-Patent Literature 1 discloses a polarized waveguide filter in which a plurality of rectangular cavity resonators are connected through a coupling hole.

In the polarized waveguide filter disclosed in Non-Patent Literature 1, one of the plurality of rectangular cavity resonators excites two modes, a TE10 mode and a TE20 mode.

In addition, in the polarized waveguide filter disclosed in Non-Patent Literature 1, by creating a bypass path in the one rectangular cavity resonator, an attenuation pole that attenuates a signal in a given frequency band is created.

CITATION LIST

Patent Literatures

Non-Patent Literature 1: "WR-3 Band Quasi-Elliptical Waveguide Filters Using Higher Order Mode Resonances", IEEE, 2017

SUMMARY OF INVENTION

Technical Problem

In the polarized waveguide filter disclosed in Non-Patent Literature 1, a frequency of the attenuation pole can be changed by adjusting a relative position of the rectangular cavity resonator that excites the two modes to a waveguide or a relative position of the rectangular cavity resonator that excites the two modes to another rectangular cavity resonator.

However, the adjustment also slightly changes a resonance frequency of the TE20 mode, and thus, pass characteristics are influenced. Hence, if the resonance frequency of the TE20 mode can be separately adjusted, then it becomes easy to create an attenuation pole at a desired frequency and it becomes easy to make an adjustment to obtain desired pass characteristics. Parameters that adjust the resonance frequency of the TE20 mode are the dimensions of a cavity resonator, and when the dimensions of the cavity resonator are changed, frequencies of the two modes, the TE10 mode and the TE20 mode, are changed together. Namely, if the resonance frequency of the TE20 mode is increased by adjusting the dimensions of the rectangular cavity resonator that excites the two modes, then the resonance frequency of the TE10 mode increases with the increase, resulting in that the amount of the shift in the resonance frequency of the TE20 mode is substantially the same as the amount of the shift in the resonance frequency of the TE10 mode. If the resonance frequency of the TE20 mode is reduced by adjusting the dimensions of the rectangular cavity resonator that excites the two modes, then the resonance frequency of the TE10 mode decreases with the reduction, resulting in that the amount of the shift in the resonance frequency of the TE20 mode is substantially the same as the amount of the shift in the resonance frequency of the TE10 mode. Hence, the polarized waveguide filter disclosed in Non-Patent Literature 1 has a problem that it is difficult to adjust the resonance frequency of each of the TE10 mode and the TE20 mode by largely shifting the resonance frequency of the TE20 mode compared with the TE10 mode.

The invention is to solve a problem such as that described above, and an object of the invention is to obtain a polarized waveguide filter and an antenna feeding circuit that can make the amount of the shift in the resonance frequency of the TE10 mode different from the amount of the shift in the resonance frequency of the TE20 mode.

Solution to Problem

A polarized waveguide filter according to the invention includes a first rectangular waveguide; a second rectangular waveguide; and a rectangular cavity resonator to excite a TE10 mode and a TE20 mode of an electromagnetic wave, the rectangular cavity resonator having a first edge surface connected to an electromagnetic wave exit plane of the first rectangular waveguide via a coupling unit, the rectangular cavity resonator having a second edge surface connected to an electromagnetic wave incident plane of the second rectangular waveguide via a coupling unit, the second edge surface facing the first edge surface. The rectangular cavity resonator has two first wall surfaces and two second wall surfaces each of which is narrower in area than the first wall surfaces, and at least one protrusion to shift a resonance frequency of the TE10 mode and a resonance frequency of the TE20 mode by respective amounts different from each other is provided on at least one of the two first wall surfaces, in such a way as to protrude outward from the rectangular cavity resonator.

Advantageous Effects of Invention

According to the invention, the polarized waveguide filter is formed in which the rectangular cavity resonator has the two first wall surfaces and the two second wall surfaces each of which is narrower in area than the first wall surfaces, and the protrusion to shift the resonance frequency of the TE10 mode and the resonance frequency of the TE20 mode by respective amounts different from each other is provided on the at least one of the two first wall surfaces, in such a way as to protrude outward from the rectangular cavity resonator. Thus, the polarized waveguide filter according to the invention can make the amount of the shift in the resonance frequency of the TE10 mode which is excited by the rectangular cavity resonator different from the amount of the shift in the resonance frequency of the TE20 mode which is excited by the rectangular cavity resonator.

DESCRIPTION OF EMBODIMENTS

To describe the invention in more detail, embodiments for carrying out the invention will be described below with reference to the accompanying drawings.

First Embodiment

Figure 1:
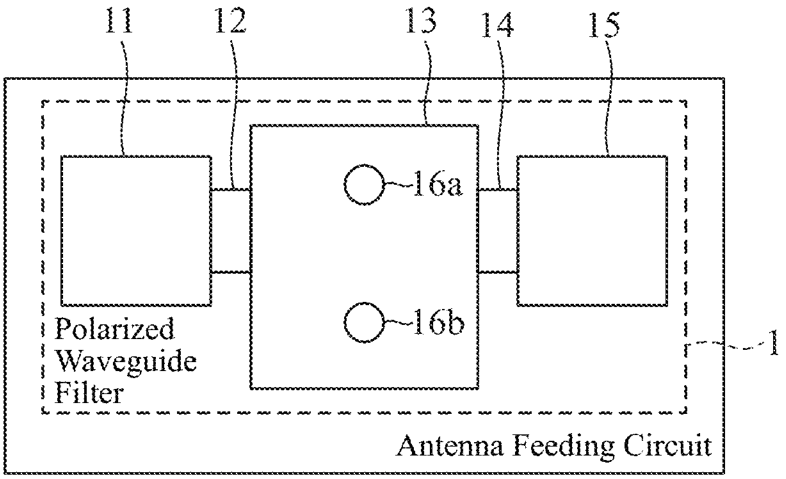
FIG. 1 is a configuration diagram showing an antenna feeding circuit including a polarized waveguide filter 1 according to a first embodiment.

FIG. 1 is a configuration diagram showing an antenna feeding circuit including a polarized waveguide filter 1 according to a first embodiment.

The antenna feeding circuit for satellite communication uses the polarized waveguide filter 1 so as to, for example, allow a signal in one frequency band out of signals in two frequency bands to pass through, and attenuate a signal in the other frequency band.

Figure 2:
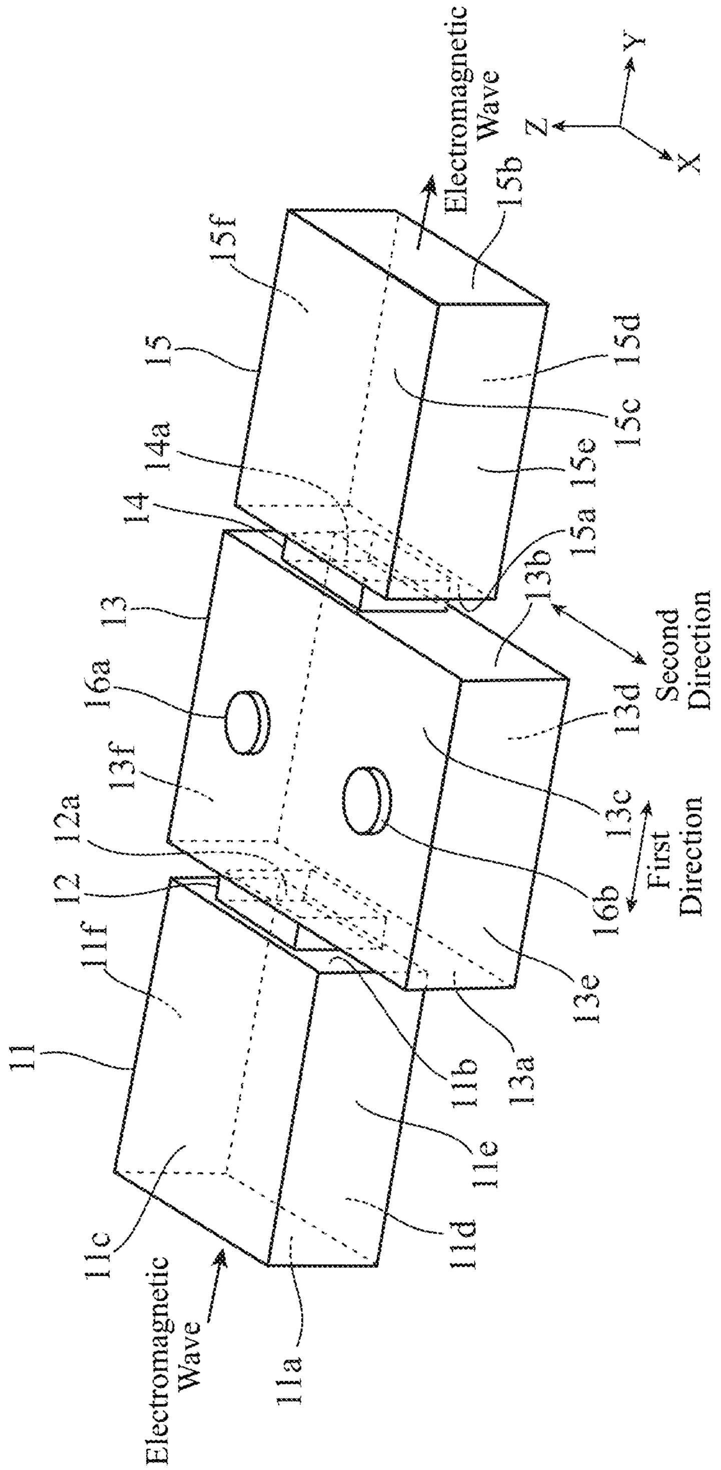
FIG. 2 is a perspective view showing the polarized waveguide filter 1 according to the first embodiment.

FIG. 2 is a perspective view showing the polarized waveguide filter 1 according to the first embodiment.

In FIG. 2, a first rectangular waveguide 11 is installed in parallel to an X-Y plane.

An incident plane 11*a* of the first rectangular waveguide 11 is a plane parallel to a Z-X plane, and the incident plane 11*a* is a plane on which an electromagnetic wave which is a signal in a given frequency band is incident.

An exit plane 11*b* of the first rectangular waveguide 11 is a plane parallel to the Z-X plane, and the exit plane 11*b* is a plane from which the electromagnetic wave incident from the incident plane 11*a* exits.

The exit plane 11*b* of the first rectangular waveguide 11 is connected to a first edge surface 13*a* of a rectangular cavity resonator 13 via a coupling unit 12, and the electromagnetic wave incident from the incident plane 11*a* is coupled to the rectangular cavity resonator 13 through a coupling hole 12*a* of the coupling unit 12.

The first rectangular waveguide 11 includes a third wall surface 11*c*, a third wall surface 11*d*, a fourth wall surface 11*e*, and a fourth wall surface 11*f*.

Each of the third wall surface 11*c* and the third wall surface 11*d* is a surface parallel to the X-Y plane, and each of the third wall surface 11*c* and the third wall surface 11*d* is a wide wall surface wider in area than each of the fourth wall surface 11*e* and the fourth wall surface 11*f*.

Each of the fourth wall surface 11*e* and the fourth wall surface 11*f* is a surface parallel to a Y-Z plane, and each of the fourth wall surface 11*e* and the fourth wall surface 11*f* is a narrow wall surface narrower in area than each of the third wall surface 11*c* and the third wall surface 11*d*.

The coupling unit 12 connects the exit plane 11*b* of the first rectangular waveguide 11 to the first edge surface 13*a* of the rectangular cavity resonator 13.

The coupling unit 12 has the coupling hole 12*a* for coupling the electromagnetic wave incident on the first rectangular waveguide 11 to the rectangular cavity resonator 13.

The rectangular cavity resonator 13 is installed in parallel to the X-Y plane.

The first edge surface 13*a* of the rectangular cavity resonator 13 is a surface parallel to the Z-X plane, and the first edge surface 13*a* is connected to the exit plane 11*b* of the first rectangular waveguide 11 via the coupling unit 12.

A second edge surface 13*b* of the rectangular cavity resonator 13 is a surface parallel to the Z-X plane, and faces the first edge surface 13*a*. The second edge surface 13*b* is connected to an incident plane 15*a* of a second rectangular waveguide 15 via a coupling unit 14.

The rectangular cavity resonator 13 excites each of a TE10 mode and a TE20 mode of the electromagnetic wave.

The rectangular cavity resonator 13 includes a first wall surface 13*c*, a first wall surface 13*d*, a second wall surface 13*e*, and a second wall surface 13*f*.

Each of the first wall surface 13*c* and the first wall surface 13*d* is a surface parallel to the X-Y plane, and each of the first wall surface 13*c* and the first wall surface 13*d* is a wide wall surface wider in area than each of the second wall surface 13*e* and the second wall surface 13*f*.

Each of the second wall surface 13*e* and the second wall surface 13*f* is a surface parallel to the Y-Z plane, and each of the second wall surface 13*e* and the second wall surface 13*f* is a narrow wall surface narrower in area than each of the first wall surface 13*c* and the first wall surface 13*d*.

The coupling unit 14 connects the second edge surface 13*b* of the rectangular cavity resonator 13 to the incident plane 15*a* of the second rectangular waveguide 15.

The coupling unit 14 has a coupling hole 14*a* for coupling the electromagnetic wave incident on the rectangular cavity resonator 13 to the second rectangular waveguide 15.

The second rectangular waveguide 15 is installed in parallel to the X-Y plane.

The incident plane 15*a* of the second rectangular waveguide 15 is a plane parallel to the Z-X plane, and the incident plane 15*a* is connected to the second edge surface 13*b* of the rectangular cavity resonator 13 via the coupling unit 14.

An exit plane 15*b* of the second rectangular waveguide 15 is a plane parallel to the Z-X plane, and the exit plane 15*b* is a plane from which the electromagnetic wave incident from the incident plane 15*a* exits.

The second rectangular waveguide 15 includes a third wall surface 15*c*, a third wall surface 15*d*, a fourth wall surface 15*e*, and a fourth wall surface 15*f*.

Each of the third wall surface 15*c* and the third wall surface 15*d* is a surface parallel to the X-Y plane, and each of the third wall surface 15*c* and the third wall surface 15*d* is a wide wall surface wider in area than each of the fourth wall surface 15*e* and the fourth wall surface 15*f*.

Each of the fourth wall surface 15*e* and the fourth wall surface 15*f* is a surface parallel to the Y-Z plane, and each of the fourth wall surface 15*e* and the fourth wall surface 15*f* is a narrow wall surface narrower in area than each of the third wall surface 15*c* and the third wall surface 15*d*.

Here, it is assumed that a direction orthogonal to each of the first edge surface 13*a* and the second edge surface 13*b* is a first direction, and a direction orthogonal to the first direction is a second direction. The first direction is a direction parallel to a y-axis, and the second direction is a direction parallel to an x-axis.

In the polarized waveguide filter 1 shown in FIG. 2, dimensions in the second direction of the first wall surfaces 13*c* and 13*d* are longer than dimensions in the second direction of the third wall surfaces 11*c*, 11*d*, 15*c*, and 15*d*.

A protrusion 16*a* is provided on the first wall surface 13*c* of the rectangular cavity resonator 13 in such a way as to protrude outward from the rectangular cavity resonator 13. The inside of the protrusion 16*a* is hollow, and the space inside the protrusion 16*a* is continuous with the space inside the rectangular cavity resonator 13.

The protrusion 16*a* shifts the resonance frequency of the TE10 mode and the resonance frequency of the TE20 mode by respective amounts different from each other.

Figure 3:
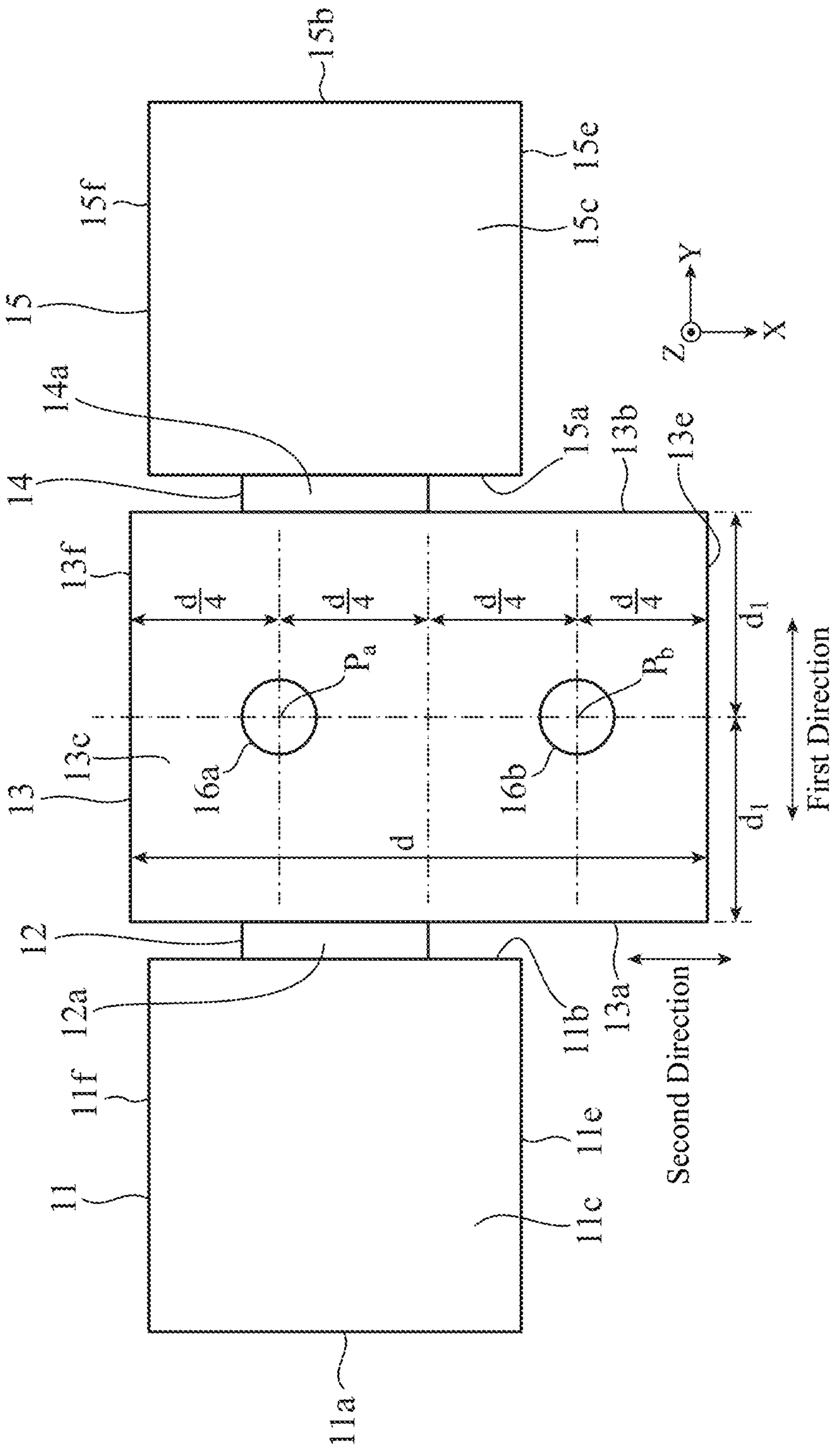
FIG. 3 is an explanatory diagram showing an installation position of each of a protrusion 16*a* and a protrusion 16*b*.

FIG. 3 is an explanatory diagram showing an installation position of each of the protrusion 16*a* and a protrusion 16*b*.

$P_a$ is, as shown in FIG. 3, a position in which the protrusion 16*a* is provided on the first wall surface 13*c*, and the position $P_a$ is a position in which a distance di from the first edge surface 13*a* is identical to a distance di from the second edge surface 13*b*. The position in which the distances di are identical to each other which is used here is not limited to a position in which the two distances exactly match each other, and may be a position in which the two distances differ from each other within a range in which no practical problems occur.

In addition, the position $P_a$ is, as shown in FIG. 3, a position in which a distance from the second wall surface 13*f* which is one edge portion in the second direction of the first wall surface 13*c* is one-quarter of a dimension d in the second direction of the first wall surface 13*c*. The one-quarter position used here is not limited to a position in which the distance from the second wall surface 13*f* is exactly one-quarter of the dimension d of the first wall surface 13*c*, and the distance from the second wall surface 13*f* may be shifted from the one-quarter position of the dimension d of the first wall surface 13*c* within a range in which no practical problems occur.

When the protrusion 16*a* is installed in the position $P_a$, the protrusion 16*a* shifts the resonance frequency of the TE20 mode to a high frequency side without shifting the resonance frequency of the TE10 mode almost at all.

The protrusion 16*b* is provided on the first wall surface 13*c* of the rectangular cavity resonator 13 in such a way as to protrude outward from the rectangular cavity resonator 13. The inside of the protrusion 16*b* is hollow, and the space inside the protrusion 16*b* is continuous with the space inside the rectangular cavity resonator 13.

The protrusion 16*b* shifts the resonance frequency of the TE10 mode and the resonance frequency of the TE20 mode by respective amounts different from each other.

$P_b$ is, as shown in FIG. 3, a position in which the protrusion 16*b* is provided on the first wall surface 13*c*, and the position $P_b$ is a position in which a distance di from the first edge surface 13*a* is identical to a distance di from the second edge surface 13*b*. The position in which the distances di are identical to each other which is used here is not limited to a position in which the two distances exactly match each other, and may be a position in which the two distances differ from each other within a range in which no practical problems occur.

In addition, the position $P_b$ is, as shown in FIG. 3, a position in which a distance from the second wall surface 13*f* which is one edge portion in the second direction of the first wall surface 13*c* is about three-fourths of the dimension d in the second direction of the first wall surface 13*c*. The three-fourths position used here is not limited to a position in which the distance from the second wall surface 13*f* is exactly three-fourths of the dimension d of the first wall surface 13*c*, and the distance from the second wall surface 13*f* may be shifted from the three-fourths position of the dimension d of the first wall surface 13*c* within a range in which no practical problems occur.

When the protrusion 16*b* is installed in the position $P_b$, the protrusion 16*b* shifts the resonance frequency of the TE20 mode to a high frequency side without shifting the resonance frequency of the TE10 mode almost at all.

Next, operations of the polarized waveguide filter 1 shown in FIG. 2 will be described.

In the first rectangular waveguide 11, an electromagnetic wave which is a signal in a given frequency band is incident from the incident plane 11*a*. The first rectangular waveguide 11 transmits a TE10 mode in a rectangular waveguide, as a fundamental mode.

The electromagnetic wave incident on the first rectangular waveguide 11 is coupled to the rectangular cavity resonator 13 through the coupling hole 12*a* of the coupling unit 12.

Since the dimensions in the second direction of the first wall surfaces 13*c* and 13*d* of the rectangular cavity resonator 13 are longer than the dimensions in the second direction of the third wall surfaces 11*c* and 11*d* of the first rectangular waveguide 11, the rectangular cavity resonator 13 excites each of the TE10 mode and the TE20 mode of the electromagnetic wave.

Figure 4:
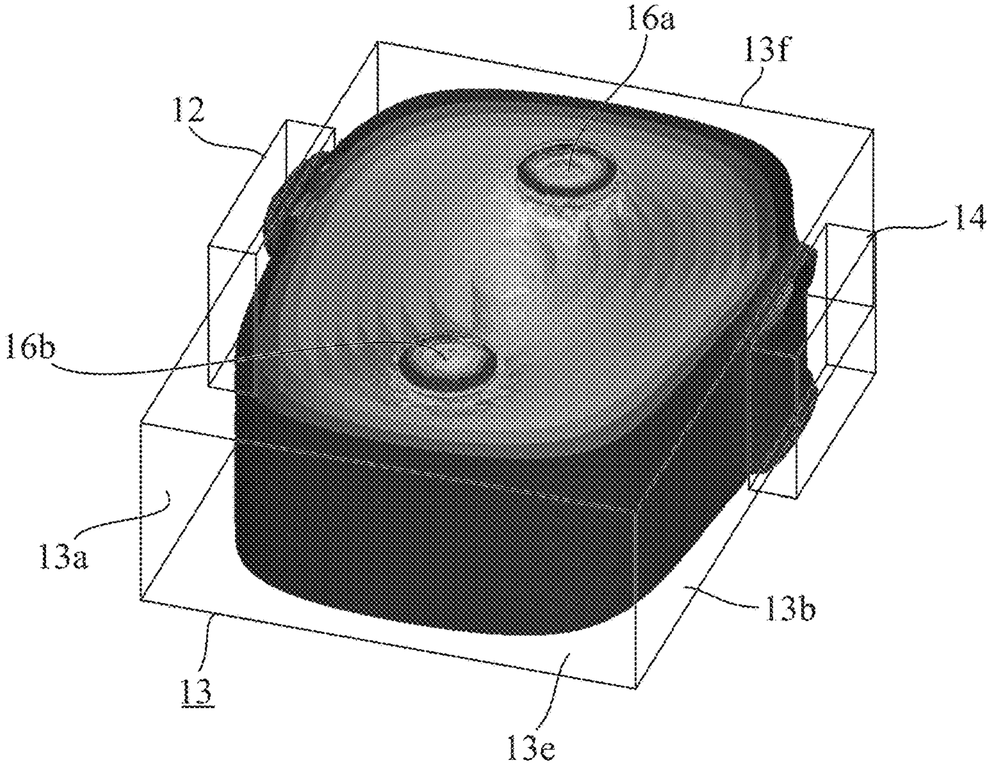
FIG. 4 is an explanatory diagram showing an electric field distribution of resonance of a TE10 mode of an electromagnetic wave.
Figure 5:
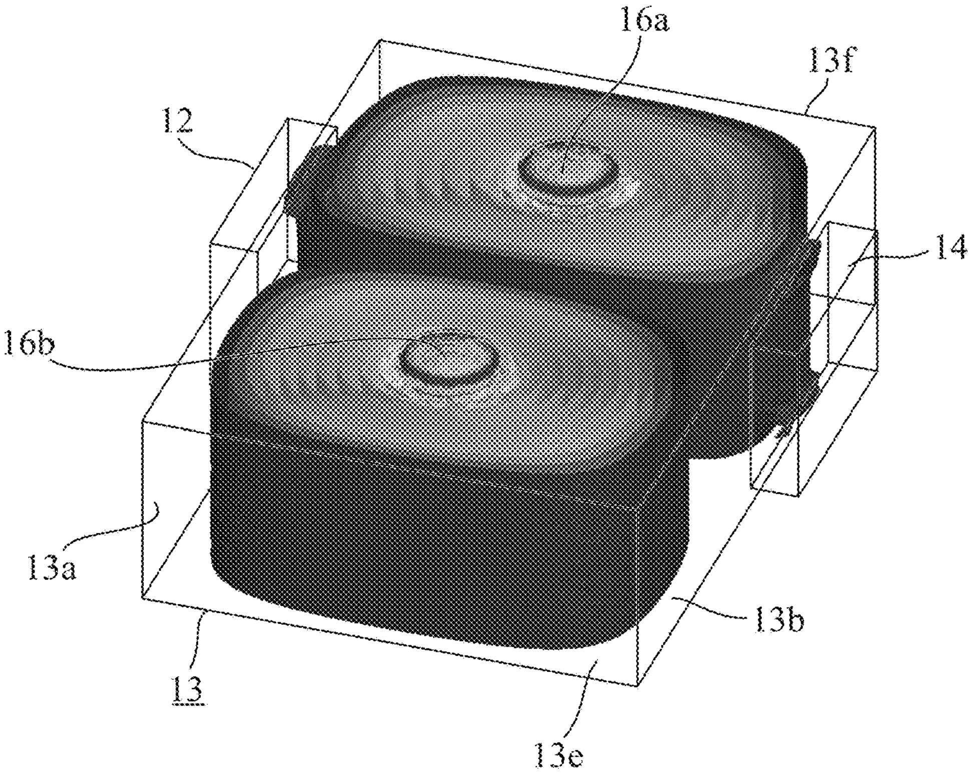
FIG. 5 is an explanatory diagram showing an electric field distribution of resonance of a TE20 mode of an electromagnetic wave.

FIG. 4 is an explanatory diagram showing an electric field distribution of resonance of the TE10 mode of the electromagnetic wave, and FIG. 5 is an explanatory diagram showing an electric field distribution of resonance of the TE20 mode of the electromagnetic wave.

The electromagnetic wave incident on the rectangular cavity resonator 13 is coupled to the second rectangular waveguide 15 through resonance of each of the TE10 mode and the TE20 mode and through the coupling hole 14*a* of the coupling unit 14.

The electromagnetic wave incident on the second rectangular waveguide 15 exits outside from the exit plane 15*b*.

By the rectangular cavity resonator 13 exciting each of the TE10 mode and the TE20 mode of the electromagnetic wave, a path corresponding to the TE10 mode and a path corresponding to the TE20 mode are created inside the rectangular cavity resonator 13.

By the creation of two paths, i.e., the path corresponding to the TE10 mode and the path corresponding to the TE20 mode, inside the rectangular cavity resonator 13, an attenuation pole that depends on a difference between the two paths is created inside the rectangular cavity resonator 13.

The protrusions 16*a* and 16*b* are provided on the first wall surface 13*c* of the rectangular cavity resonator 13.

The position $P_a$ in which the protrusion 16*a* is provided is, as shown in FIG. 3, a position in which a distance di from the first edge surface 13*a* is roughly identical to a distance di from the second edge surface 13*b*.

In addition, the position $P_a$ in which the protrusion 16*a* is provided is, as shown in FIG. 3, a position in which a distance from the second wall surface 13*f* is about one-quarter of the dimension d in the second direction of the first wall surface 13*c*.

The position $P_b$ in which the protrusion 16*b* is provided is, as shown in FIG. 3, a position in which a distance di from the first edge surface 13*a* is roughly identical to a distance di from the second edge surface 13*b*.

In addition, the position $P_b$ in which the protrusion 16*b* is provided is, as shown in FIG. 3, a position in which a distance from the second wall surface 13*f* is about three-fourths of the dimension d in the second direction of the first wall surface 13*c*.

Each of the position $P_a$ and the position $P_b$ is, as shown in FIG. 5, a position in which the electric field of the TE20 mode is large.

Each of the position $P_a$ and the position $P_b$ is, as shown in FIG. 4, off a position in which the electric field of the TE10 mode is large.

Thus, when the protrusions 16*a* and 16*b* are provided on the first wall surface 13*c* of the rectangular cavity resonator 13, the resonance frequency of the TE20 mode is shifted to a high frequency side, while the resonance frequency of the TE10 mode does not change almost at all.

By the shift in the resonance frequency of the TE20 mode to the high frequency side, the frequency of an attenuation pole created inside the rectangular cavity resonator 13 changes.

In the polarized waveguide filter 1 shown in FIG. 2, the two protrusions 16*a* and 16*b* are provided on the first wall surface 13*c* of the rectangular cavity resonator 13. However, this is merely an example, and as shown in FIG. 6, two protrusions 16*c* and 16*d* may be provided on the first wall surface 13*d* of the rectangular cavity resonator 13, in addition to the two protrusions 16*a* and 16*b* provided on the first wall surface 13*c* of the rectangular cavity resonator 13.

Figure 6:
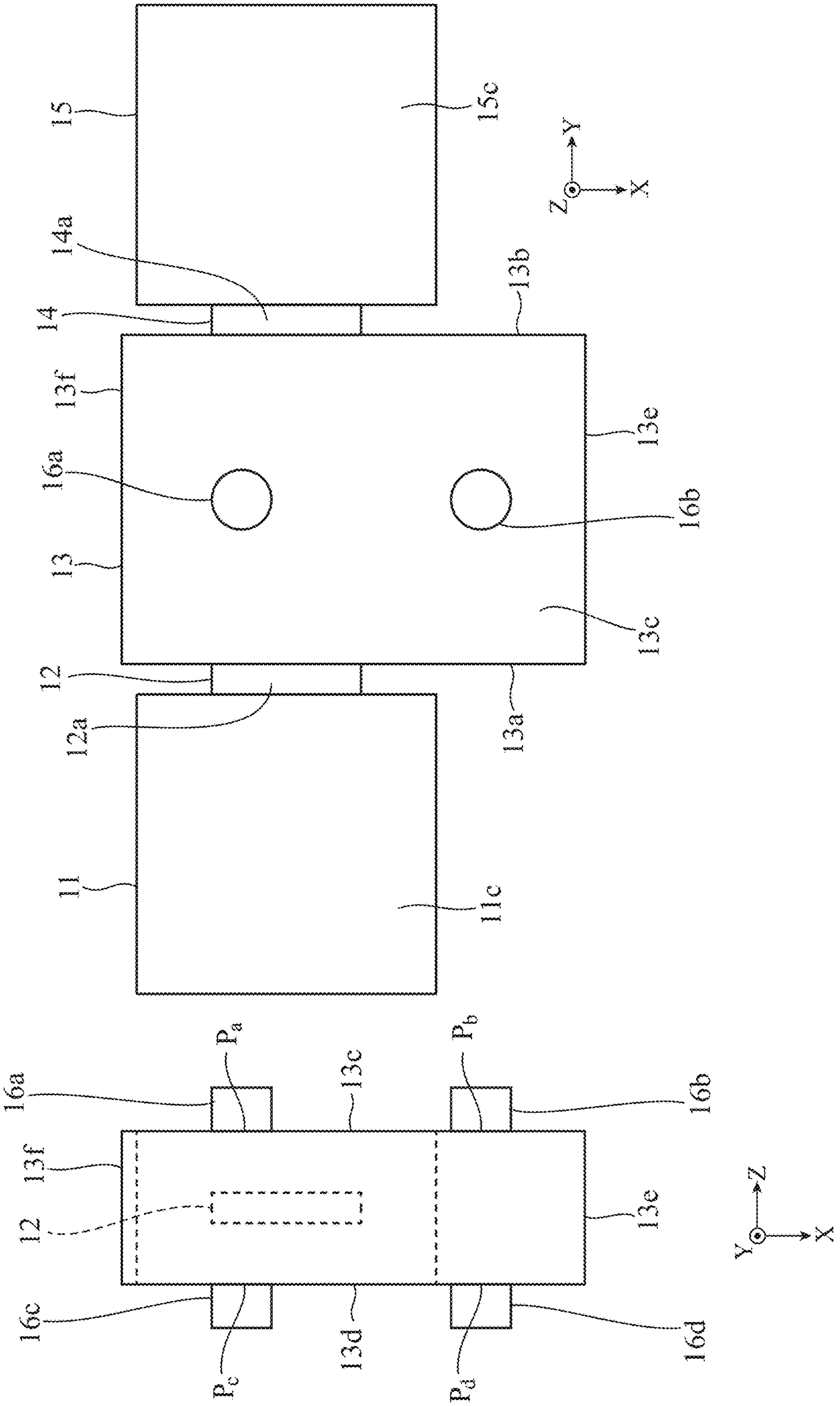
FIG. 6 is a configuration diagram showing the protrusions 16*a* and 16*b* provided on a first wall surface 13*c* of a rectangular cavity resonator 13 and protrusions 16*c* and 16*d* provided on a first wall surface 13*d*.

FIG. 6 is a configuration diagram showing the protrusions 16*a* and 16*b* provided on the first wall surface 13*c* of the rectangular cavity resonator 13 and the protrusions 16*c* and 16*d* provided on the first wall surface 13*d*.

A position Pc in which the protrusion 16*c* is provided on the first wall surface 13*d* is, as with the position $P_a$, a position in which a distance di from the first edge surface 13*a* is roughly identical to a distance di from the second edge surface 13*b*.

In addition, the position Pc in which the protrusion 16*c* is provided is, as with the position $P_a$, a position in which a distance from the second wall surface 13*f* is about one-quarter of the dimension d in the second direction of the first wall surface 13*d*.

A position $P_a$ in which the protrusion 16*d* is provided on the first wall surface 13*d* is, as with the position $P_b$, a position in which a distance di from the first edge surface 13*a* is roughly identical to a distance di from the second edge surface 13*b*.

In addition, the position $P_a$ in which the protrusion 16*d* is provided is, as with the position $P_b$, a position in which a distance from the second wall surface 13*f* is about three-fourths of the dimension d in the second direction of the first wall surface 13*d*.

By providing the two protrusions 16*c* and 16*d* in addition to the two protrusions 16*a* and 16*b*, the amount of the shift in the resonance frequency of the TE20 mode to the high frequency side can be increased over a case in which only the protrusions 16*a* and 16*b* are provided.

In the polarized waveguide filter 1 shown in FIG. 2, the two protrusions 16*a* and 16*b* are provided on the first wall surface 13*c*. In the polarized waveguide filter 1 shown in FIG. 6, the two protrusions 16*a* and 16*b* are provided on the first wall surface 13*c*, and the two protrusions 16*c* and 16*d* are provided on the first wall surface 13*d*.

Figure 7:
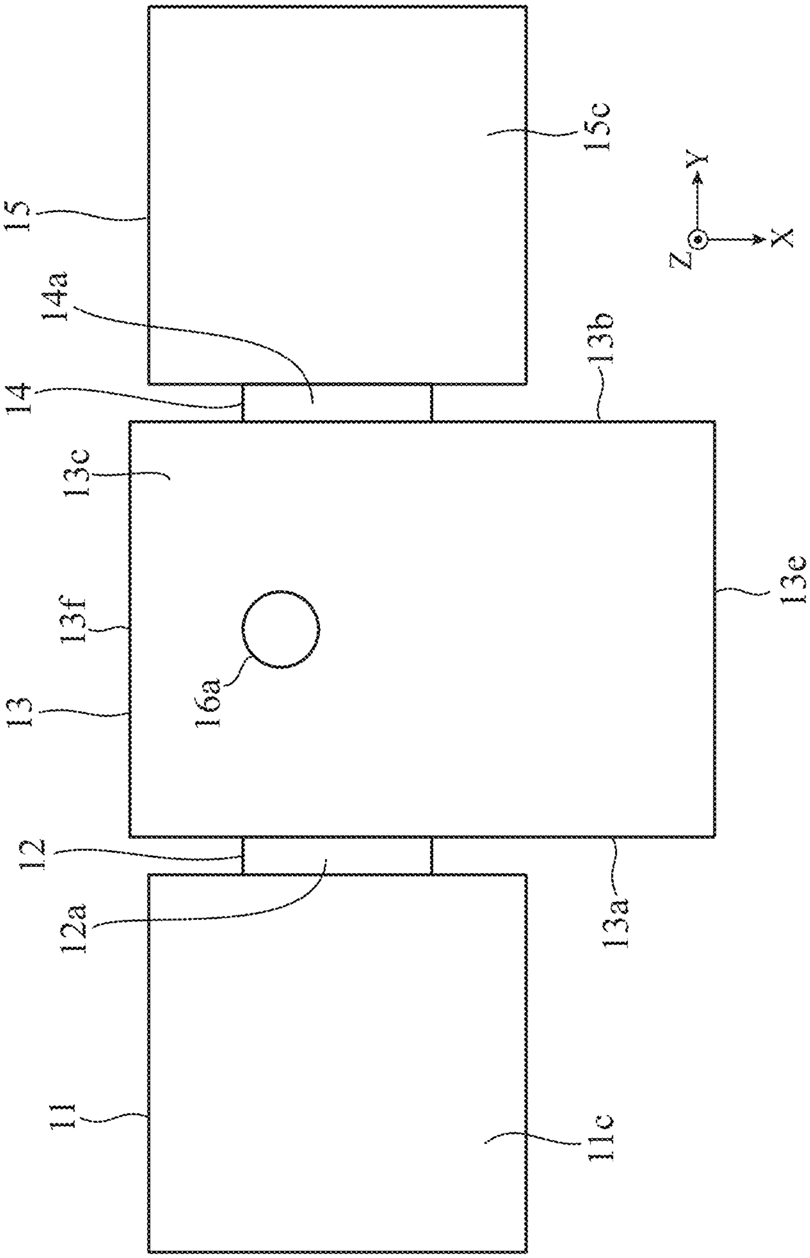
FIG. 7 is a configuration diagram showing the protrusion 16*a* provided on the first wall surface 13*c* of the rectangular cavity resonator 13.
Figure 8:
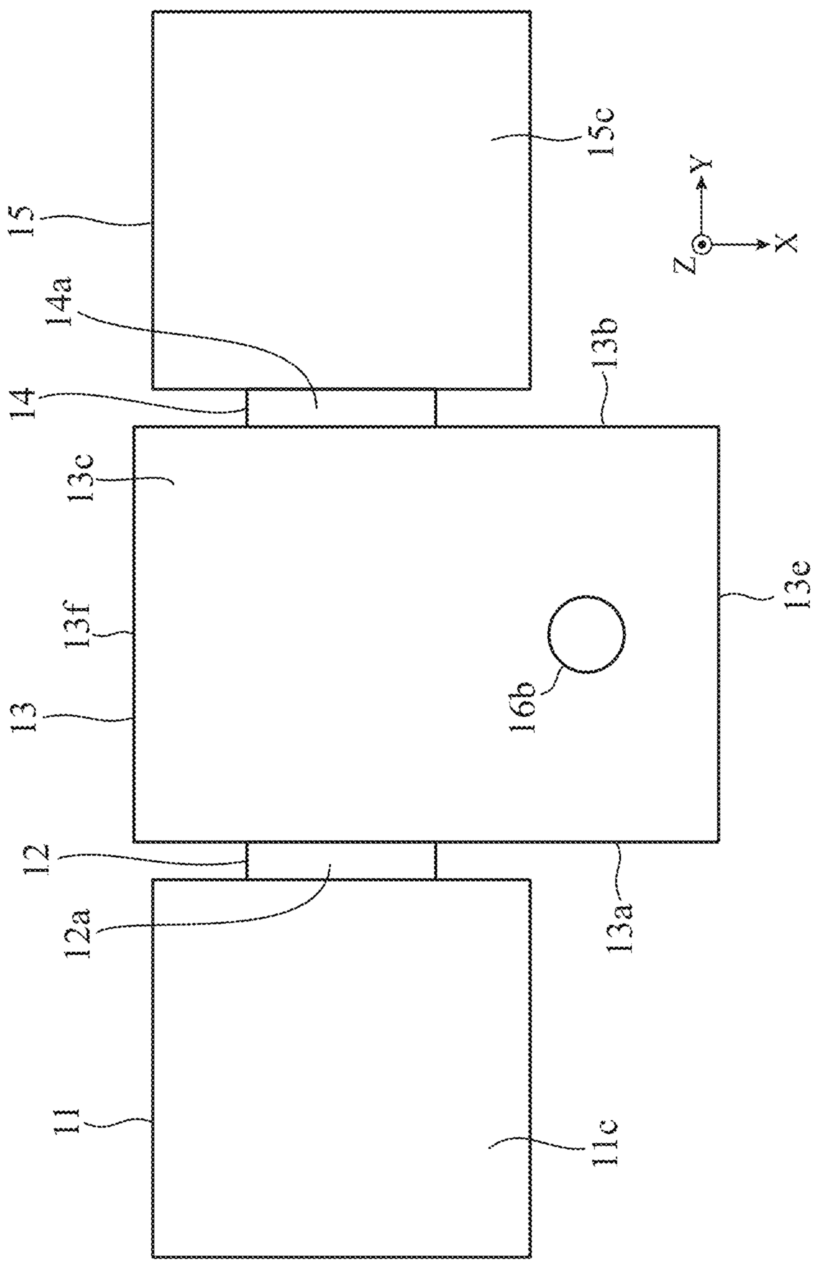
FIG. 8 is a configuration diagram showing the protrusion 16*b* provided on the first wall surface 13*c* of the rectangular cavity resonator 13.

However, they are merely examples, and as shown in FIG. 7 or 8, only one of the protrusions 16*a* and 16*b* may be provided on the first wall surface 13*c*. In addition, only one of the protrusions 16*c* and 16*d* may be provided on the first wall surface 13*d*.

Thus, on the first wall surfaces 13*c* and 13*d* there may be provided one protrusion in total or there may be provided three or four protrusions in total.

FIG. 7 is a configuration diagram showing the protrusion 16*a* provided on the first wall surface 13*c* of the rectangular cavity resonator 13.

FIG. 8 is a configuration diagram showing the protrusion 16*b* provided on the first wall surface 13*c* of the rectangular cavity resonator 13.

In the polarized waveguide filter 1 shown in FIG. 7, the position $P_a$ in which the protrusion 16*a* is provided is a position in which a distance from the second wall surface 13*f* is about one-quarter of the dimension d in the second direction of the first wall surface 13*d*. Thus, when the protrusion 16*a* is provided on the first wall surface 13*c*, the resonance frequency of the TE20 mode is shifted to a high frequency side, while the resonance frequency of the TE10 mode does not change almost at all.

Figure 9:
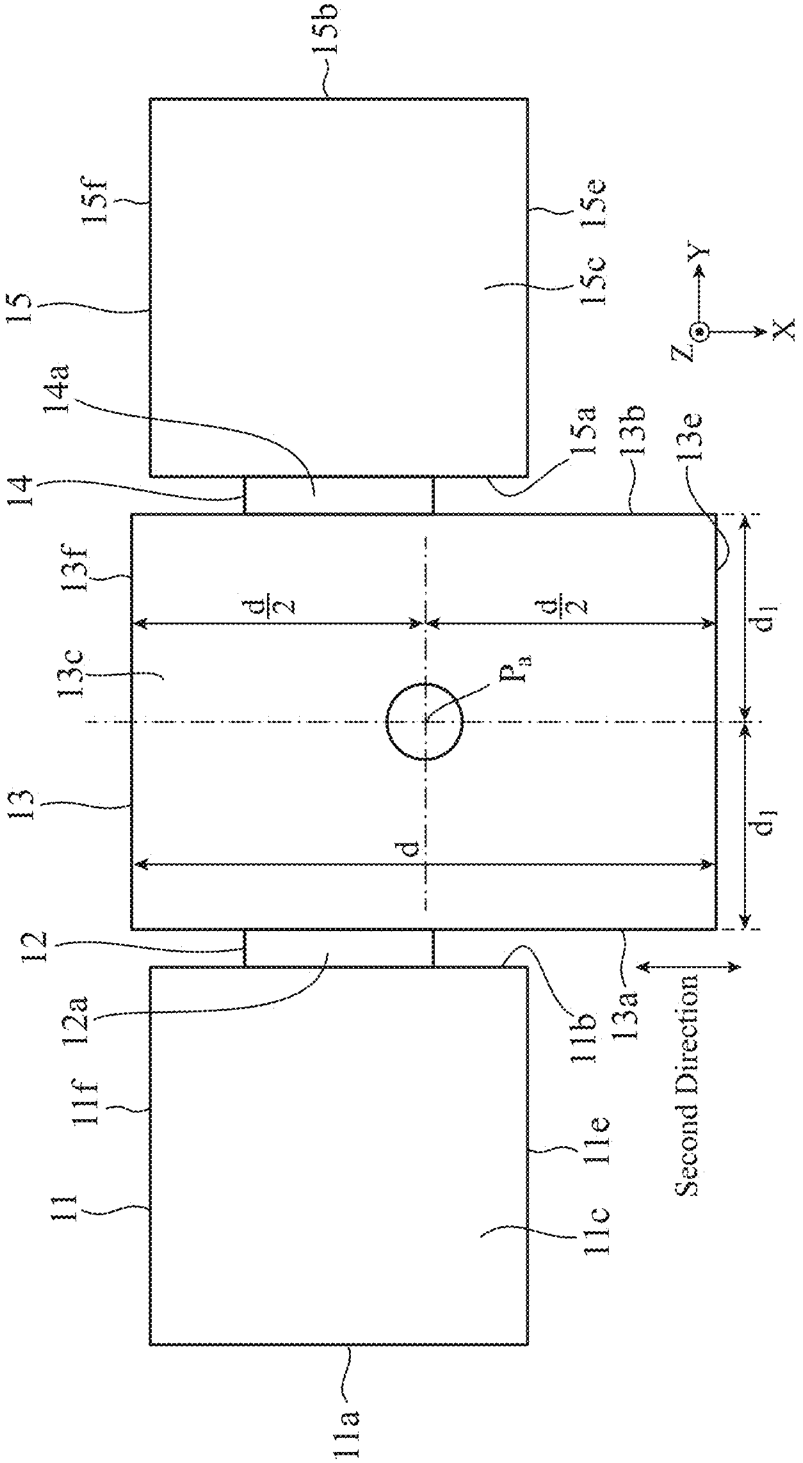
FIG. 9 is an explanatory diagram showing an installation position of the protrusion 16*a*.

It is assumed that the position $P_a$ in which the protrusion 16*a* is provided is, for example, as shown in FIG. 9, a position in which a distance from the second wall surface 13*f* is one-half of the dimension d in the second direction of the first wall surface 13*d*. When the position $P_a$ in which the protrusion 16*a* is provided is the one-half position of the dimension d of the first wall surface 13*d*, the resonance frequency of the TE10 mode is shifted to a high frequency side, while the resonance frequency of the TE20 mode does not change almost at all. The one-half position used here is not limited to a position in which the distance from the second wall surface 13*f* is exactly one-half of the dimension d of the first wall surface 13*c*, and the distance from the second wall surface 13*f* may be shifted from the one-half position of the dimension d of the first wall surface 13*c* within a range in which no practical problems occur.

FIG. 9 is an explanatory diagram showing an installation position of the protrusion 16*a*.

The position $P_a$ in which the protrusion 16*a* is provided is, as shown in FIG. 9, a position in which a distance di from the first edge surface 13*a* is identical to a distance di from the second edge surface 13*b*. The position in which the distances di are identical to each other which is used here is not limited to a position in which the two distances exactly match each other, and may be a position in which the two distances differ from each other within a range in which no practical problems occur.

In the above-described first embodiment, the polarized waveguide filter 1 is formed in which the protrusions 16*a* and 16*b* that shift the resonance frequency of the TE10 mode and the resonance frequency of the TE20 mode by respective amounts different from each other are provided on one or more first wall surfaces out of the two first wall surfaces 13*c* and 13*d* of the rectangular cavity resonator 13, in such a way as to protrude outward from the rectangular cavity resonator 13. Thus, the polarized waveguide filter 1 can make the amount of the shift in the resonance frequency of the TE10 mode which is excited by the rectangular cavity resonator 13 different from the amount of the shift in the resonance frequency of the TE20 mode which is excited by the rectangular cavity resonator 13.

Figure 10:
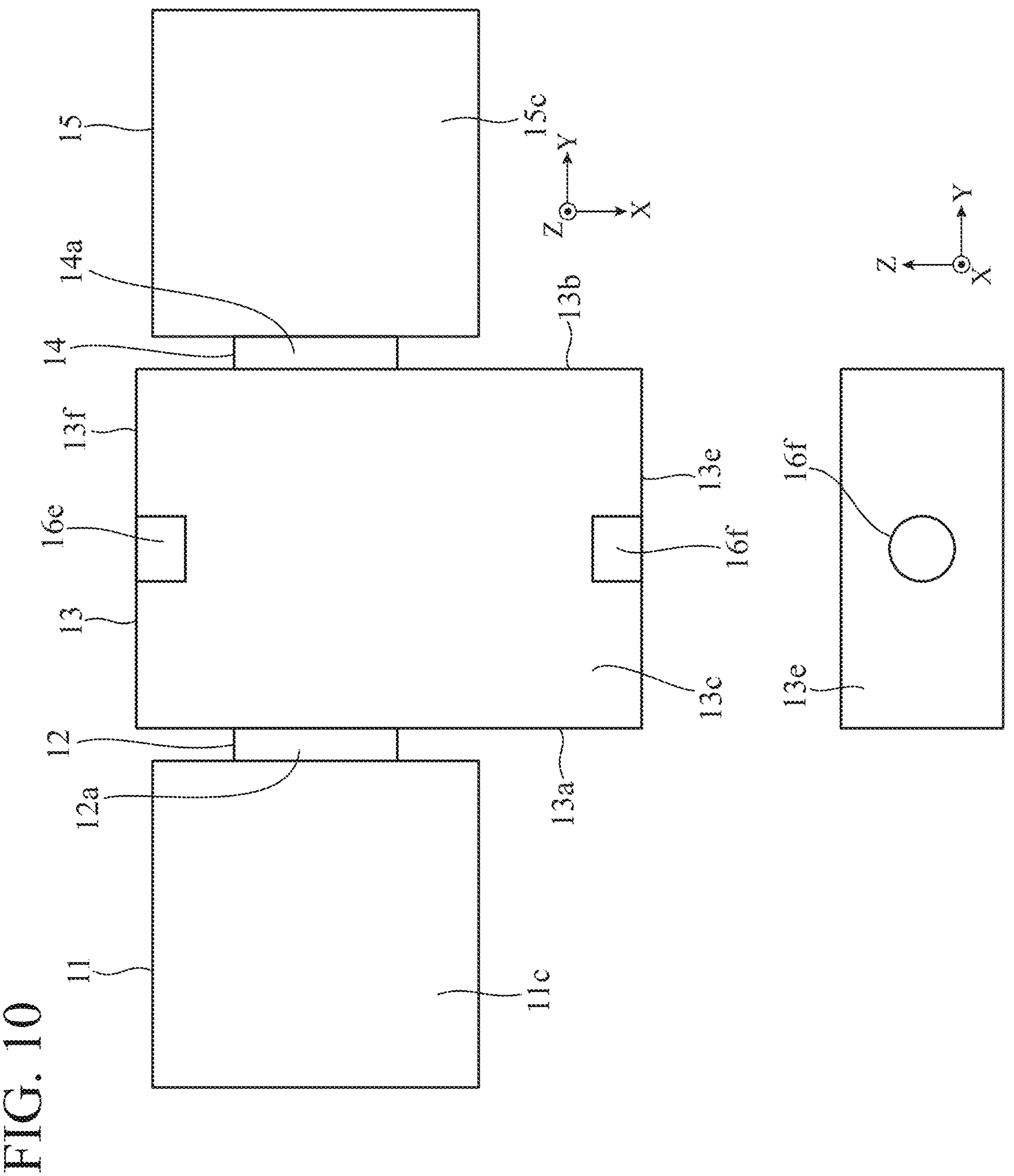
FIG. 10 is a configuration diagram showing protrusions 16*e* and 16*f* provided in second wall surfaces 13*e* and 13*f* of the rectangular cavity resonator 13.

As shown in FIG. 10, by providing protrusions 16*e* and 16*f* in the second wall surfaces 13*e* and 13*f* of the rectangular cavity resonator 13 in such a way as to protrude toward the inner side of the rectangular cavity resonator 13, each of the resonance frequency of the TE10 mode and the resonance frequency of the TE20 mode can be shifted to a high frequency side.

FIG. 10 is a configuration diagram showing the protrusions 16*e* and 16*f* provided in the second wall surfaces 13*e* and 13*f* of the rectangular cavity resonator 13.

However, positions in which the protrusions 16*e* and 16*f* are provided are off each of the position in which the electric field of the TE10 mode is large and the position in which the electric field of the TE20 mode is large, and there is not much difference between them.

Thus, by providing the protrusions 16*e* and 16*f* in the second wall surfaces 13*e* and 13*f* of the rectangular cavity resonator 13, not only the resonance frequency of the TE20 mode is shifted to a high frequency side, but also the resonance frequency of the TE10 mode is shifted to a high frequency side.

When the protrusions 16*e* and 16*f* are provided in the second wall surfaces 13*e* and 13*f*, compared with a case in which the protrusions 16*a* and 16*b* are provided on the first wall surface 13*c*, a difference between the resonance frequency of the TE10 mode after shifting and the resonance frequency of the TE20 mode after shifting is not large. Hence, when the protrusions 16*e* and 16*f* are provided in the second wall surfaces 13*e* and 13*f*, compared with a case in which the protrusions 16*a* and 16*b* are provided on the first wall surface 13*c*, the amount of the change in the frequency of an attenuation pole created inside the rectangular cavity resonator 13 is small.

Note that when the protrusions 16*a* and 16*b* are provided on the first wall surface 13*c*, a loss in the power of a signal in a given frequency band, etc., can be reduced over a case in which the protrusions 16*e* and 16*f* are provided in the second wall surfaces 13*e* and 13*f*.

Second Embodiment

In a second embodiment, a polarized waveguide filter 1 will be described in which a dimension of a protrusion 16*a* in a direction in which the protrusion 16*a* protrudes outward from a rectangular cavity resonator 13 differs from a dimension of a protrusion 16*b* in a direction in which the protrusion 16*b* protrudes outward from the rectangular cavity resonator 13. The directions in which the protrusions 16*a* and 16*b* protrude outward from the rectangular cavity resonator 13 are directions parallel to a Z-axis.

Figure 11:
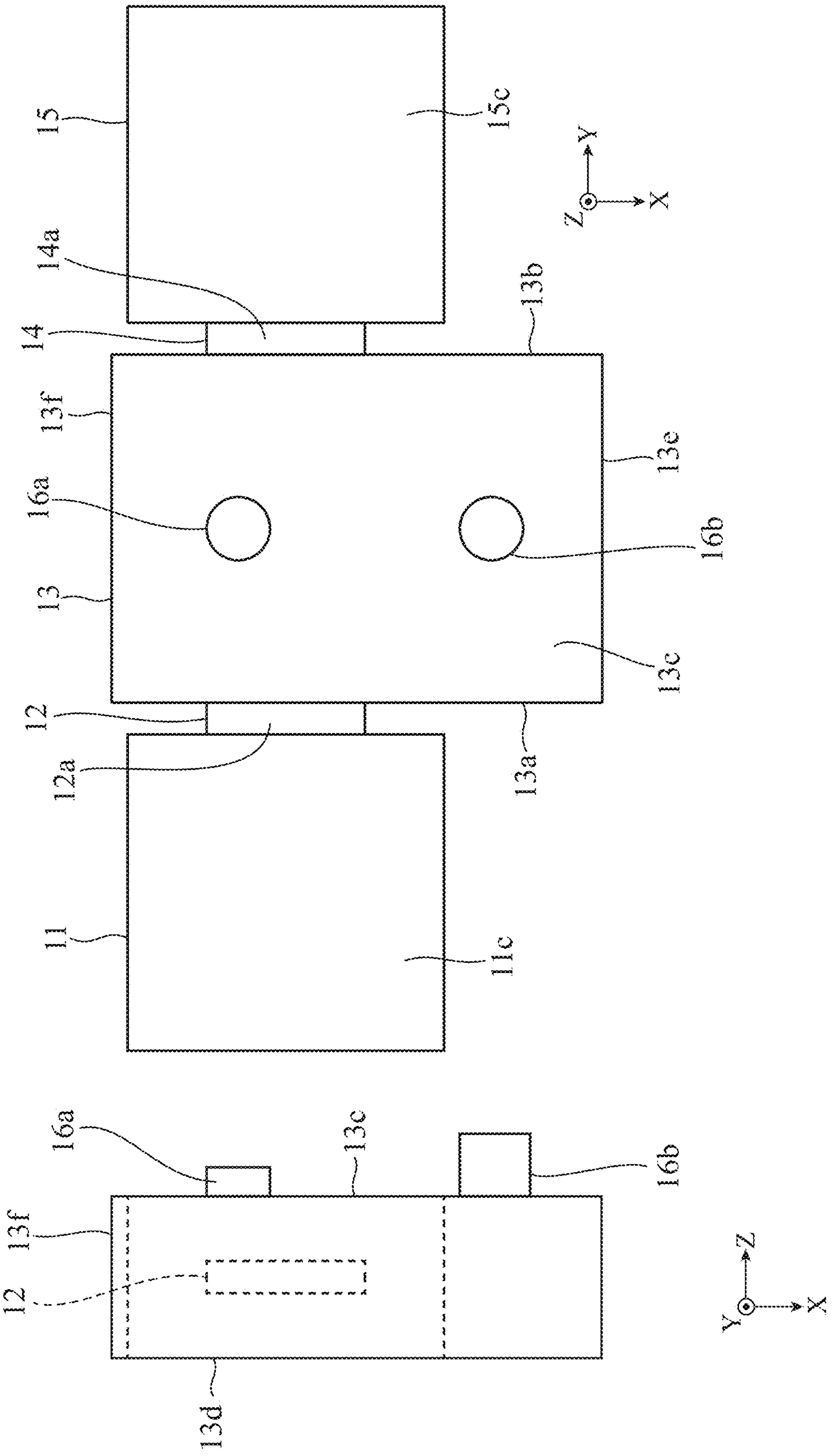
FIG. 11 is a configuration diagram showing a polarized waveguide filter 1 according to a second embodiment.

FIG. 11 is a configuration diagram showing the polarized waveguide filter 1 according to the second embodiment. In FIG. 11, the same reference signs as those of FIGS. 2 and 3 indicate the same or corresponding portions and thus description thereof is omitted.

The dimension of the protrusion 16*b* in the direction in which the protrusion 16*b* protrudes outward from the rectangular cavity resonator 13 is longer than the dimension of the protrusion 16*a* in the direction in which the protrusion 16*a* protrudes outward from the rectangular cavity resonator 13.

Each of the protrusion 16*a* and the protrusion 16*b* acts to shift the resonance frequency of the TE20 mode to a high frequency side.

However, since the dimension in the outward protruding direction is longer in the protrusion 16*b* than the protrusion 16*a*, the amount of the shift to the high frequency side resulting from the provision of the protrusion 16*b* is larger than the amount of the shift to the high frequency side resulting from the provision of the protrusion 16*a*.

By making the dimension of the protrusion 16*b* in the outward protruding direction different from the dimension of the protrusion 16*a* in the outward protruding direction, the amount of the shift to the high frequency side can be changed.

Third Embodiment

In the polarized waveguide filter 1 shown in FIG. 1, there are shown the protrusions 16*a* and 16*b* each having a cylindrical shape.

In a third embodiment, a polarized waveguide filter 1 will be described in which protrusions 16*a* and 16*b* each have a rectangular parallelepiped shape.

In the polarized waveguide filter 1 shown in FIG. 1, there are shown the protrusions 16*a* and 16*b* each having a cylindrical shape. However, this is merely an example, and for example, as shown in FIG. 12, the protrusions 16*a* and 16*b* may each have a rectangular parallelepiped shape.

Figure 12:
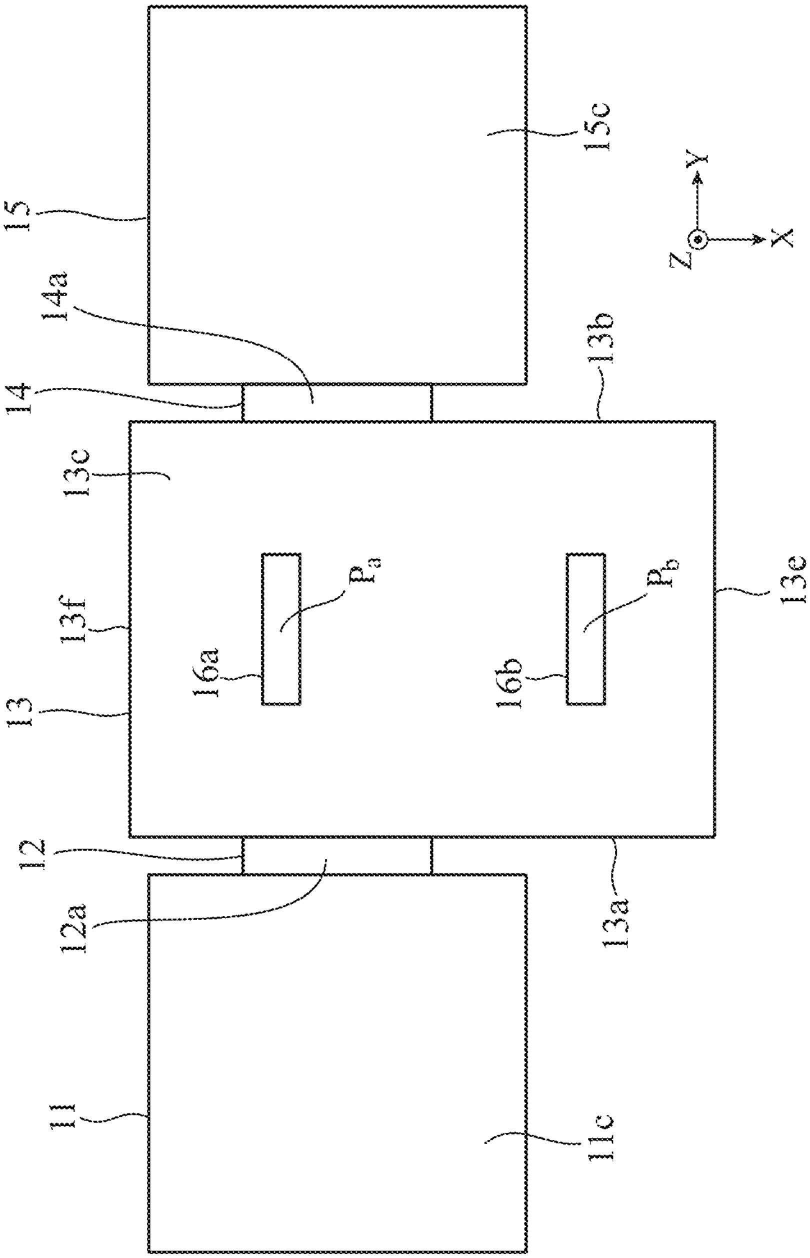
FIG. 12 is a configuration diagram showing a polarized waveguide filter 1 according to a third embodiment.

FIG. 12 is a configuration diagram showing the polarized waveguide filter 1 according to the third embodiment. In FIG. 12, the same reference signs as those of FIGS. 2 and 3 indicate the same or corresponding portions and thus description thereof is omitted.

In the polarized waveguide filter 1 shown in FIG. 12, the protrusions 16*a* and 16*b* each have a rectangular parallelepiped shape, and lengths of the protrusions 16*a* and 16*b* in a direction parallel to the Y-axis are longer than lengths of the protrusions 16*a* and 16*b* in a direction parallel to the X-axis. Such rectangular parallelepiped shape is hereinafter referred to as "horizontally oriented rectangular parallelepiped shape".

In a case where the protrusions 16*a* and 16*b* each have a cylindrical shape, even if the protrusion 16*a* is provided in the position $P_a$ on the first wall surface 13*c* and the protrusion 16*b* is provided in the position $P_b$ on the first wall surface 13*c*, the resonance frequency of the TE10 mode does not change almost at all.

On the other hand, in a case where the protrusions 16*a* and 16*b* each have a horizontally oriented rectangular parallelepiped shape, if the protrusion 16*a* is provided in the position $P_a$ on the first wall surface 13*c* and the protrusion 16*b* is provided in the position $P_b$ on the first wall surface 13*c*, then not only the resonance frequency of the TE20 mode is shifted to a high frequency side, but also the resonance frequency of the TE10 mode is slightly shifted to a high frequency side. However, the amount of the shift in the resonance frequency of the TE10 mode to the high frequency side is very small compared with the amount of the shift in the resonance frequency of the TE20 mode to the high frequency side. Thus, a change in resonance frequency resulting from the provision of the protrusions 16*a* and 16*b* each having a horizontally oriented rectangular parallelepiped shape substantially corresponds to a change in only the resonance frequency of the TE20 mode.

In the polarized waveguide filter 1 shown in FIG. 12, the protrusions 16*a* and 16*b* each have a horizontally oriented rectangular parallelepiped shape.

Figure 13:
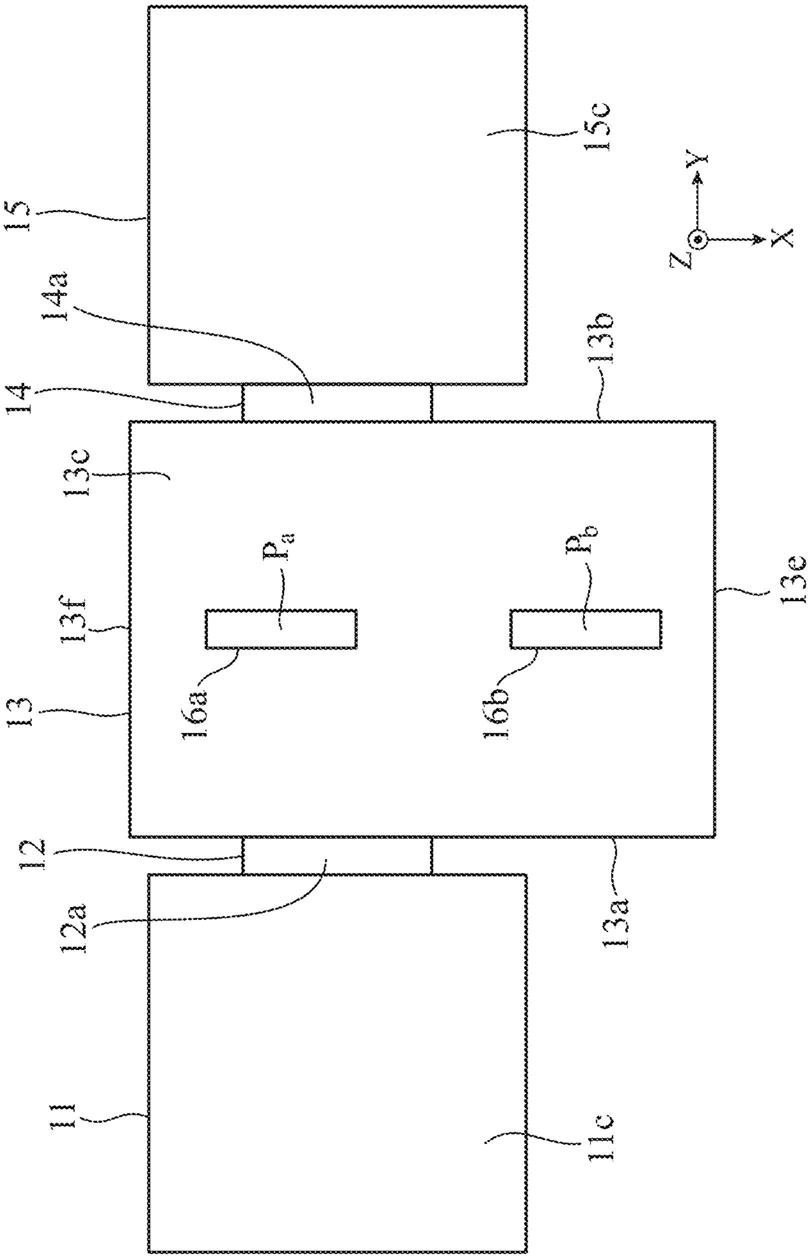
FIG. 13 is a configuration diagram showing another polarized waveguide filter 1 according to the third embodiment.

However, this is merely an example, and as shown in FIG. 13, the protrusions 16*a* and 16*b* may each have a rectangular parallelepiped shape, and the lengths of the protrusions 16*a* and 16*b* in the direction parallel to the Y-axis may be shorter than the lengths of the protrusions 16*a* and 16*b* in the direction parallel to the X-axis. Such rectangular parallelepiped shape is hereinafter referred to as "vertically oriented rectangular parallelepiped shape".

FIG. 13 is a configuration diagram showing another polarized waveguide filter 1 according to the third embodiment.

When the protrusions 16*a* and 16*b* each have a cylindrical shape, by providing the protrusions 16*a* and 16*b* on the first wall surface 13*c*, the resonance frequency of the TE20 mode is shifted to a high frequency side.

When the protrusions 16*a* and 16*b* each have a vertically oriented rectangular parallelepiped shape, by providing the protrusions 16*a* and 16*b* on the first wall surface 13*c*, the resonance frequency of the TE20 mode is shifted to a higher frequency side than that of a case in which the protrusions 16*a* and 16*b* each have a cylindrical shape.

In either of the horizontally oriented rectangular parallelepiped shape and the vertically oriented rectangular parallelepiped shape, locations where orthogonal planes among a plurality of planes of a rectangular parallelepiped intersect may be rounded.

In addition, in six planes of the rectangular cavity resonator 13, six planes of the first rectangular waveguide 11, or six planes of the second rectangular waveguide 15, too, locations where orthogonal planes among the six planes intersect may be rounded.

If locations where planes intersect are allowed to be rounded, then a design in which a cutting process using a drill is to be performed is possible.

Figure 14:
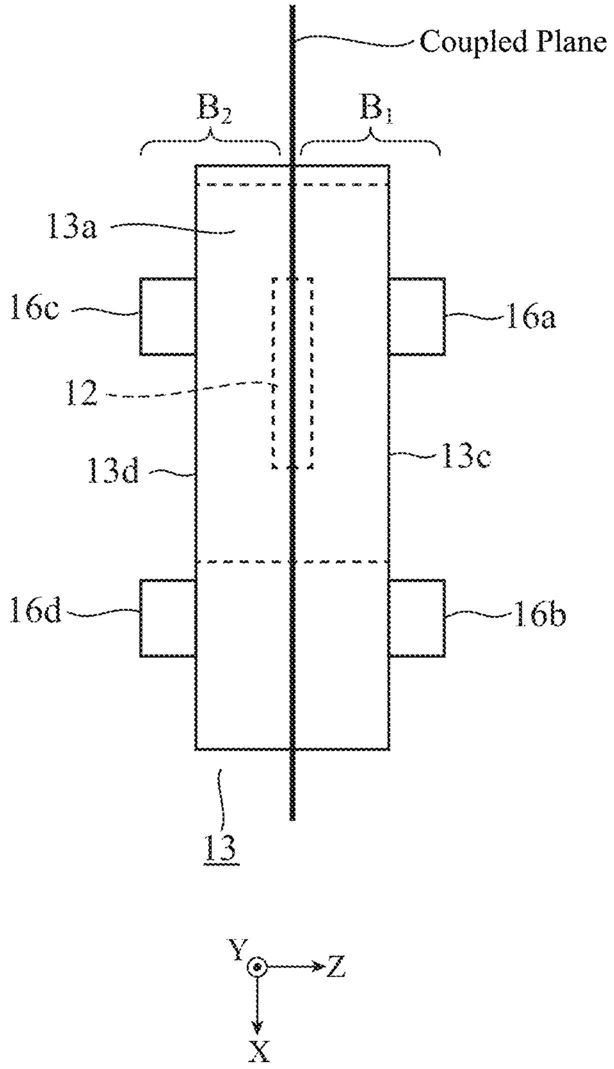
FIG. 14 is an explanatory diagram showing a polarized waveguide filter 1 in which a metal block $B_1$ is coupled to a metal block $B_2$.
Figure 15:
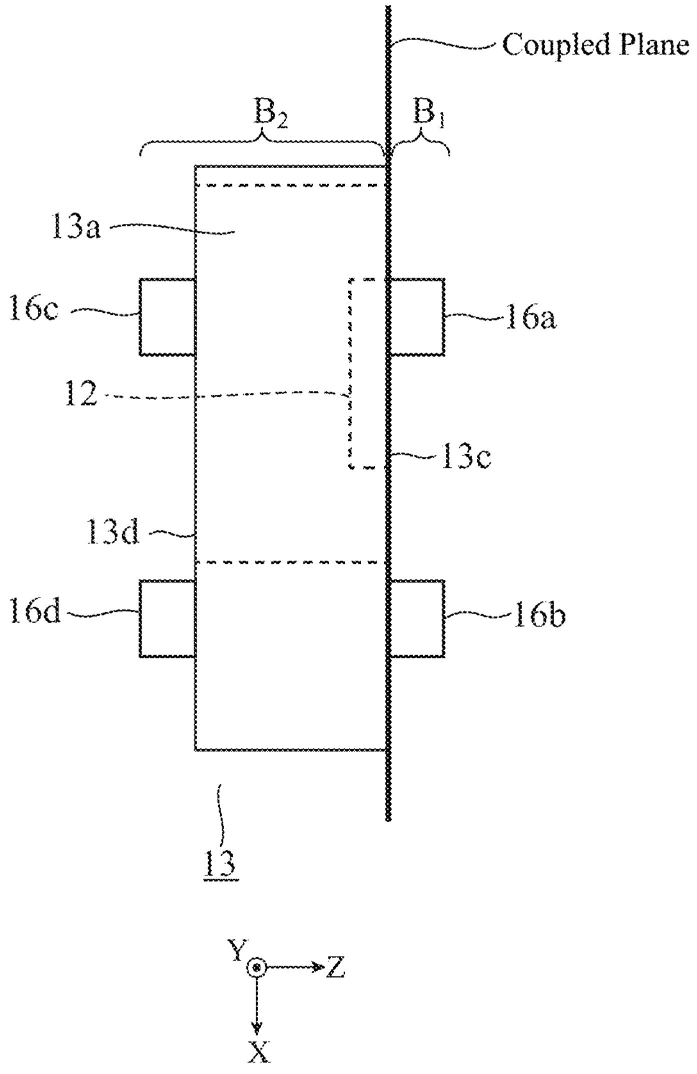
FIG. 15 is an explanatory diagram showing a polarized waveguide filter 1 in which a metal block $B_1$ is coupled to a metal block $B_2$.

As shown in FIG. 14 or 15, the polarized waveguide filter 1 can be formed by coupling a metal block $B_1$ having been subjected to a cutting process using a drill to a metal block $B_2$ having been subjected to a cutting process using a drill.

FIGS. 14 and 15 are explanatory diagrams showing polarized waveguide filters 1 each having a metal block $B_1$ and a metal block $B_2$ coupled together.

Between FIGS. 14 and 15, the position of a coupled plane of the metal block $B_1$ and the metal block $B_2$ is different, and the position of the coupling unit 12 relative to the first edge surface 13*a* of the rectangular cavity resonator 13 is different.

Fourth Embodiment

In a fourth embodiment, a polarized waveguide filter 1 including an external resonator 22 will be described.

Figure 16:
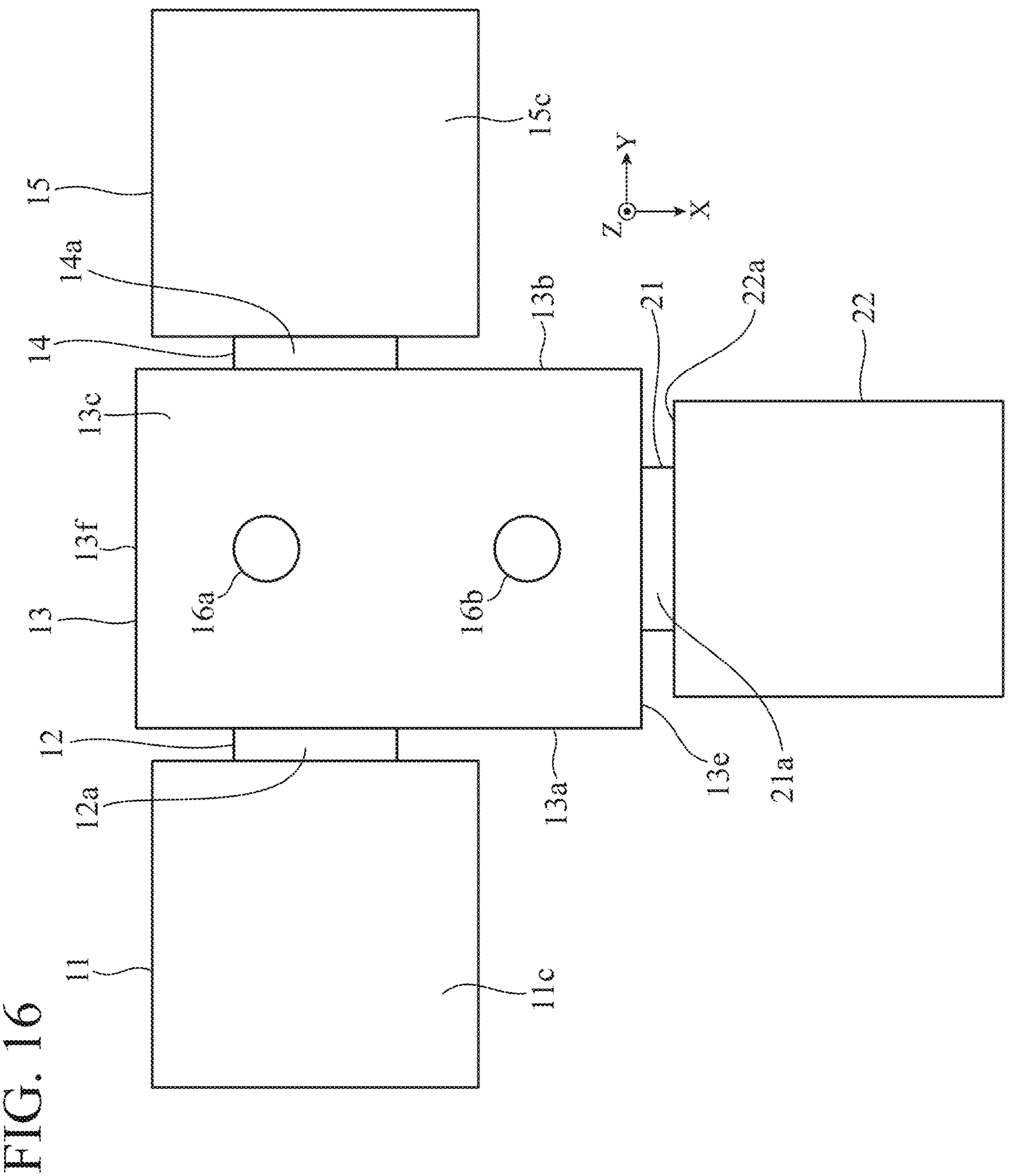
FIG. 16 is a configuration diagram showing a polarized waveguide filter 1 according to a fourth embodiment.

FIG. 16 is a configuration diagram showing the polarized waveguide filter 1 according to the fourth embodiment. In FIG. 16, the same reference signs as those of FIGS. 2 and 3 indicate the same or corresponding portions and thus description thereof is omitted.

A coupling unit 21 connects the second wall surface 13*e* of the rectangular cavity resonator 13 to an incident plane 22*a* of the external resonator 22.

The coupling unit 21 has a coupling hole 21*a* for coupling an electromagnetic wave incident on the rectangular cavity resonator 13 to the external resonator 22.

The external resonator 22 is installed in parallel to the X-Y plane.

The incident plane 22*a* of the external resonator 22 is a plane parallel to the Y-Z plane, and the incident plane 22*a* is connected to the second wall surface 13*e* of the rectangular cavity resonator 13 via the coupling unit 21.

When an electromagnetic wave is incident from the incident plane 22*a*, an attenuation pole is created inside the external resonator 22 at a frequency different from a frequency of an attenuation pole created inside the rectangular cavity resonator 13.

The frequency of the attenuation pole created inside the external resonator 22 is determined by a length of the external resonator 22 in a direction parallel to the x-axis and a length of the external resonator 22 in a direction parallel to the y-axis.

In the polarized waveguide filter 1 shown in FIG. 16, by including the external resonator 22, in addition to an attenuation pole created inside the rectangular cavity resonator 13, an attenuation pole is created at a frequency different from a frequency of the attenuation pole created inside the rectangular cavity resonator 13.

In the polarized waveguide filter 1 shown in FIG. 16, the external resonator 22 has a rectangular parallelepiped shape. However, this is merely an example, and for example, as shown in FIG. 17, a shape on the X-Y plane of an external resonator 23 may be trapezoidal.

Figure 17:
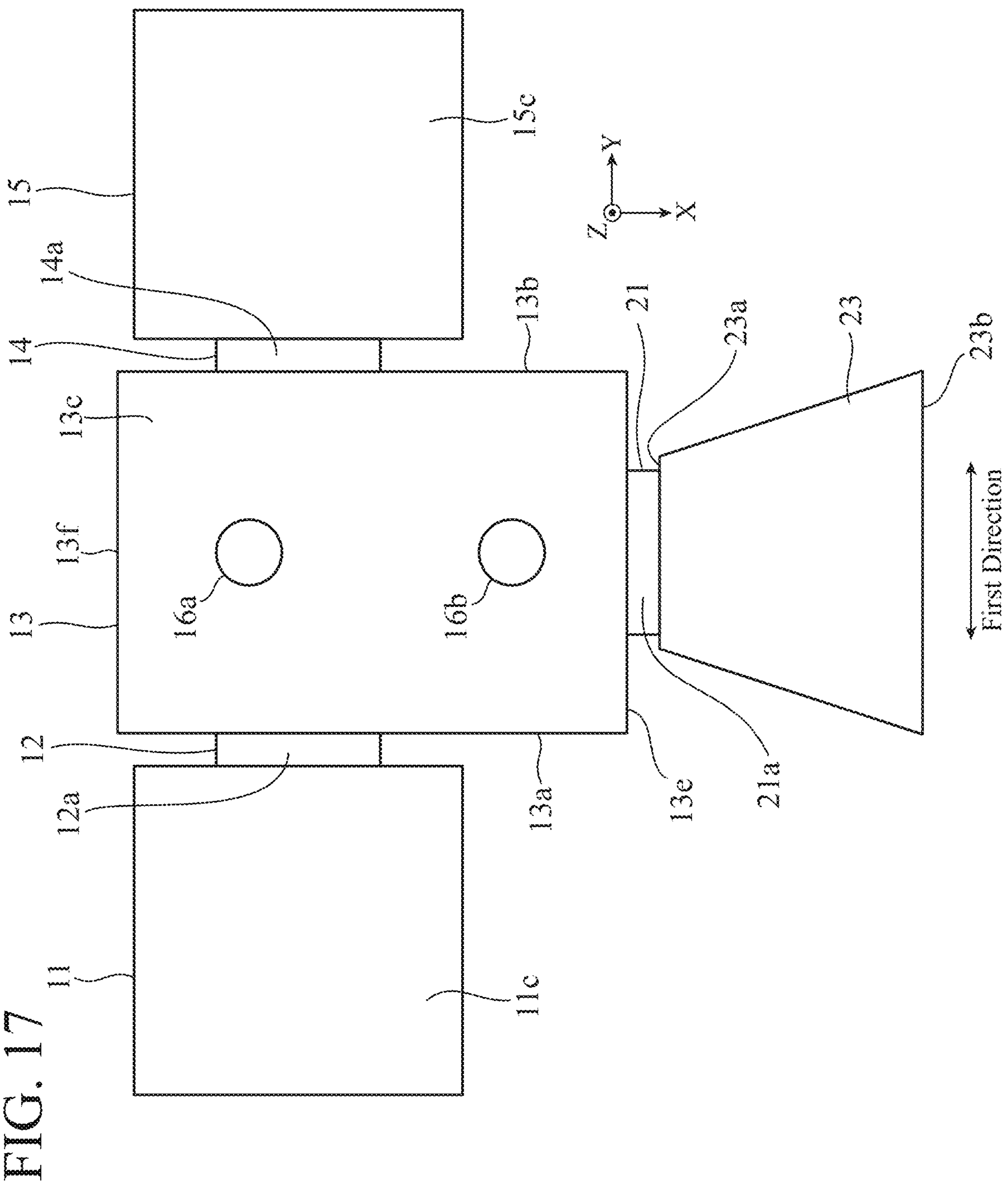
FIG. 17 is a configuration diagram showing another polarized waveguide filter 1 according to the fourth embodiment.

FIG. 17 is a configuration diagram showing another polarized waveguide filter 1 according to the fourth embodiment.

An incident plane 23*a* of the external resonator 23 is a plane parallel to the Y-Z plane, and the incident plane 23*a* is connected to the second wall surface 13*e* of the rectangular cavity resonator 13 via the coupling unit 21.

An edge surface 23*b* is a surface parallel to the Y-Z plane, and faces the incident plane 23*a*.

A length of the incident plane 23*a* in a direction parallel to the y-axis is shorter than a length of the edge surface 23*b* in the direction parallel to the y-axis. The lengths in the direction parallel to the y-axis are lengths in the first direction.

When an electromagnetic wave is incident from the incident plane 23*a*, an attenuation pole is created inside the external resonator 23 at a frequency different from a frequency of an attenuation pole created inside the rectangular cavity resonator 13.

The frequency of the attenuation pole created inside the external resonator 23 is determined by a length of the external resonator 23 in a direction parallel to the x-axis, a length of the incident plane 23*a* in a direction parallel to the y-axis, and a length of the edge surface 23*b* in the direction parallel to the y-axis.

When a shape on the X-Y plane of the external resonator 23 is trapezoidal, the number of parameters that determine a frequency of an attenuation pole created inside the external resonator 23 increases over a case in which the external resonator 22 has a rectangular parallelepiped shape, and thus, flexibility in design improves.

In the polarized waveguide filters 1 shown in FIGS. 16 and 17, the incident plane 22*a* of the external resonator 22 or the incident plane 23*a* of the external resonator 23 is connected to the second wall surface 13*e* of the rectangular cavity resonator 13 via the coupling unit 21.

However, this is merely an example, and an incident plane 22*a* of an external resonator 22 or an incident plane 23*a* of an external resonator 23 may be connected to the second wall surface 13*f* of the rectangular cavity resonator 13 via a coupling unit (not shown). Thus, the polarized waveguide filter 1 may include two external resonators 22 or two external resonators 23. In addition, the polarized waveguide filter 1 may include one external resonator 22 and one external resonator 23.

Fifth Embodiment

In a fifth embodiment, a polarized waveguide filter 1 including a second rectangular cavity resonator 32 will be described.

Figure 18:
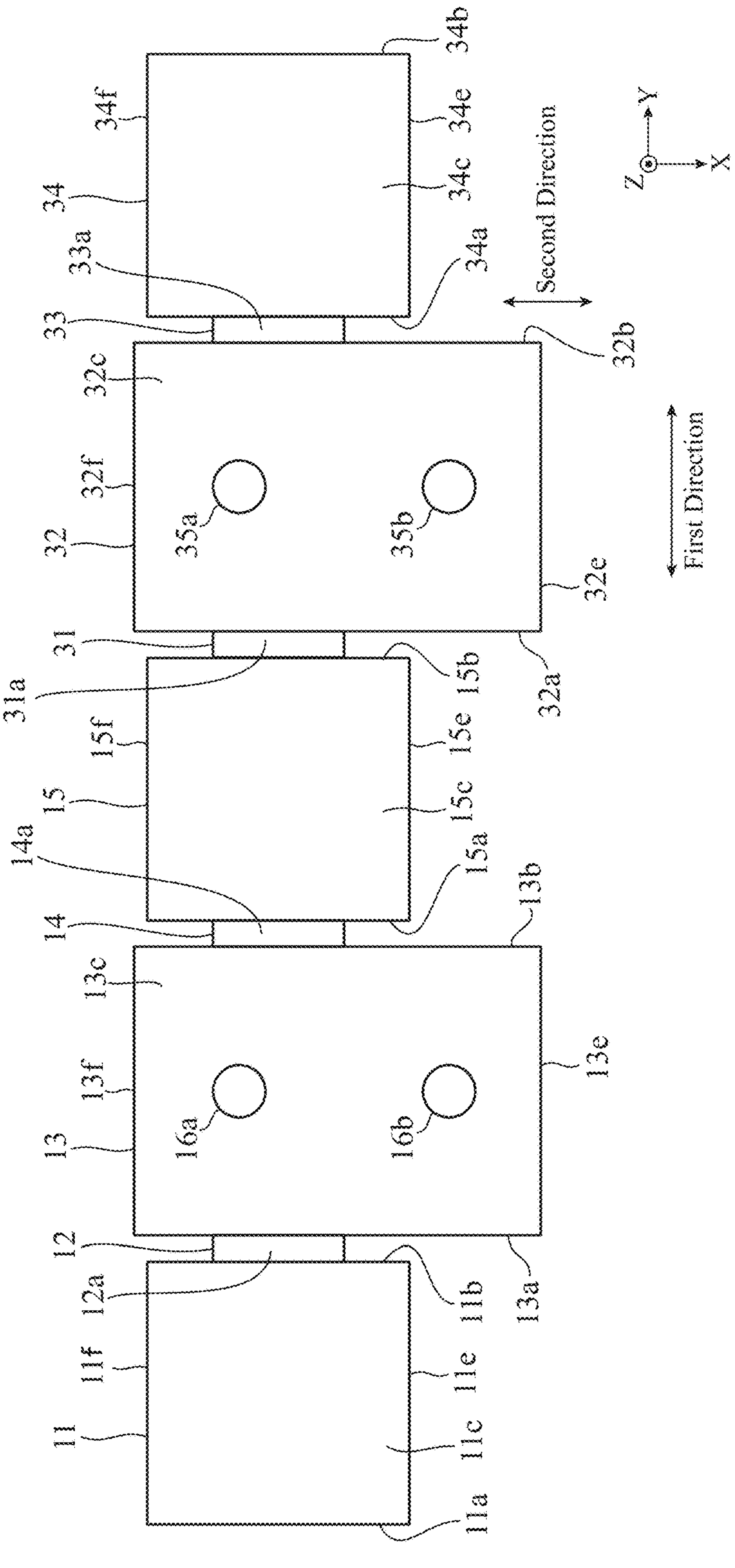
FIG. 18 is a configuration diagram showing a polarized waveguide filter 1 according to a fifth embodiment.

FIG. 18 is a configuration diagram showing the polarized waveguide filter 1 according to the fifth embodiment. In FIG. 18, the same reference signs as those of FIGS. 2 and 3 indicate the same or corresponding portions and thus description thereof is omitted.

The polarized waveguide filter 1 shown in FIG. 18 includes two rectangular cavity resonators, the rectangular cavity resonator 13 and the second rectangular cavity resonator 32. However, this is merely an example, and the polarized waveguide filter 1 may include three or more rectangular cavity resonators.

A coupling unit 31 connects the exit plane 15*b* of the second rectangular waveguide 15 to a third edge surface 32*a* of the second rectangular cavity resonator 32.

The coupling unit 31 has a coupling hole 31*a* for coupling an electromagnetic wave incident on the second rectangular waveguide 15 to the second rectangular cavity resonator 32.

The second rectangular cavity resonator 32 is installed in parallel to the X-Y plane.

The third edge surface 32*a* of the second rectangular cavity resonator 32 is a surface parallel to the Z-X plane, and the third edge surface 32*a* is connected to the exit plane 15*b* of the second rectangular waveguide 15 via the coupling unit 31.

A fourth edge surface 32*b* of the second rectangular cavity resonator 32 is a surface parallel to the Z-X plane, and faces the third edge surface 32*a*. The fourth edge surface 32*b* is connected to an incident plane 34*a* of a third rectangular waveguide 34 via a coupling unit 33.

The second rectangular cavity resonator 32 excites each of the TE10 mode and the TE20 mode of the electromagnetic wave.

The second rectangular cavity resonator 32 includes a fifth wall surface 32*c*, a sixth wall surface 32*e*, and a sixth wall surface 32*f*.

The fifth wall surface 32*c* is a surface parallel to the X-Y plane, and the fifth wall surface 32*c* is a wide wall surface wider in area than each of the sixth wall surface 32*e* and the sixth wall surface 32*f*.

FIG. 18 is a drawing of the polarized waveguide filter 1 viewed from a front direction of the paper, and when the front direction of the paper is a top side of the polarized waveguide filter 1, the fifth wall surface 32*c* is a top surface of the second rectangular cavity resonator 32. Although, in FIG. 18, a bottom surface of the second rectangular cavity resonator 32 is not shown, the bottom surface of the second rectangular cavity resonator 32 is another fifth wall surface facing the fifth wall surface 32*c*.

Each of the sixth wall surface 32*e* and the sixth wall surface 32*f* is a surface parallel to the Y-Z plane, and each of the sixth wall surface 32*e* and the sixth wall surface 32*f* is a narrow wall surface narrower in area than the fifth wall surface 32*c*.

The coupling unit 33 connects the fourth edge surface 32*b* of the second rectangular cavity resonator 32 to the incident plane 34*a* of the third rectangular waveguide 34.

The coupling unit 33 has a coupling hole 33*a* for coupling the electromagnetic wave incident on the second rectangular cavity resonator 32 to the third rectangular waveguide 34.

The third rectangular waveguide 34 is installed in parallel to the X-Y plane.

The incident plane 34*a* of the third rectangular waveguide 34 is a plane parallel to the Z-X plane, and the incident plane 34*a* is connected to the fourth edge surface 32*b* of the second rectangular cavity resonator 32 via the coupling unit 33.

An exit plane 34*b* of the third rectangular waveguide 34 is a plane parallel to the Z-X plane, and the exit plane 34*b* is a plane from which the electromagnetic wave incident from the incident plane 34*a* exits.

The third rectangular waveguide 34 includes a seventh wall surface 34*c*, an eighth wall surface 34*e*, and an eighth wall surface 34*f*.

The seventh wall surface 34*c* is a surface parallel to the X-Y plane, and the seventh wall surface 34*c* is a wide wall surface wider in area than each of the eighth wall surface 34*e* and the eighth wall surface 34*f*.

FIG. 18 is a drawing of the polarized waveguide filter 1 viewed from a front direction of the paper, and when the front direction of the paper is the top side of the polarized waveguide filter 1, the seventh wall surface 34*c* is a top surface of the third rectangular waveguide 34. Although, in FIG. 18, a bottom surface of the third rectangular waveguide 34 is not shown, the bottom surface of the third rectangular waveguide 34 is another seventh wall surface facing the seventh wall surface 34*c*.

Each of the eighth wall surface 34*e* and the eighth wall surface 34*f* is a surface parallel to the Y-Z plane, and each of the eighth wall surface 34*e* and the eighth wall surface 34*f* is a narrow wall surface narrower in area than the seventh wall surface 34*c*.

In the polarized waveguide filter 1 shown in FIG. 18, a dimension in the second direction of the fifth wall surface 32*c* is longer than each of dimensions in the second direction of the third wall surfaces 11*c*, 11*d*, 15*c*, and 15*d* and a dimension in the second direction of the seventh wall surface 34*c*.

A protrusion 35*a* is provided on the fifth wall surface 32*c* of the second rectangular cavity resonator 32 in such a way as to protrude outward. The inside of the protrusion 35*a* is hollow, and the space inside the protrusion 35*a* is continuous with the space inside the second rectangular cavity resonator 32.

The protrusion 35*a* shifts the resonance frequency of the TE10 mode and the resonance frequency of the TE20 mode by respective amounts different from each other.

A protrusion 35*b* is provided on the fifth wall surface 32*c* of the second rectangular cavity resonator 32 in such a way as to protrude outward. The inside of the protrusion 35*b* is hollow, and the space inside the protrusion 35*b* is continuous with the space inside the second rectangular cavity resonator 32.

The protrusion 35*b* shifts the resonance frequency of the TE10 mode and the resonance frequency of the TE20 mode by respective amounts different from each other.

In the polarized waveguide filter 1 shown in FIG. 18, the two protrusions 35*a* and 35*b* are provided on the fifth wall surface 32*c*. However, this is merely an example, and a protrusion that protrudes outward may also be provided on the bottom surface of the second rectangular cavity resonator 32 that faces the fifth wall surface 32*c*.

The total number of protrusions provided on the fifth wall surface 32*c* and protrusions provided on the bottom surface of the second rectangular cavity resonator 32 may be any number between one and four, inclusive.

Next, operations of the polarized waveguide filter 1 shown in FIG. 18 will be described.

It is assumed that a length of the rectangular cavity resonator 13 in a direction parallel to the x-axis is identical to a length of the second rectangular cavity resonator 32 in the direction parallel to the x-axis, and a length of the rectangular cavity resonator 13 in a direction parallel to the y-axis is identical to a length of the second rectangular cavity resonator 32 in the direction parallel to the y-axis.

In addition, it is assumed that installation positions of the protrusions 16*a* and 16*b* with respect to the first wall surface 13*c* of the rectangular cavity resonator 13 are identical to installation positions of the protrusions 35*a* and 35*b* with respect to the fifth wall surface 32*c* of the second rectangular cavity resonator 32.

Furthermore, it is assumed that dimensions of the protrusions 16*a* and 16*b* in an outward direction are identical to dimensions of the protrusions 35*a* and 35*b* in an outward direction.

When the above-described lengths, positions, and dimensions are satisfied, a frequency of an attenuation pole created inside the second rectangular cavity resonator 32 is identical to a frequency of an attenuation pole created inside the rectangular cavity resonator 13. Thus, the polarized waveguide filter 1 shown in FIG. 18 can obtain a larger amount of attenuation than that of the polarized waveguide filter 1 shown in FIG. 2.

When the installation positions of the protrusions 16*a* and 16*b* with respect to the first wall surface 13*c* of the rectangular cavity resonator 13 differ from the installation positions of the protrusions 35*a* and 35*b* with respect to the fifth wall surface 32*c* of the second rectangular cavity resonator 32, or when the dimensions of the protrusions 16*a* and 16*b* in the outward direction differ from the dimensions of the protrusions 35*a* and 35*b* in the outward direction, a frequency of an attenuation pole created inside the second rectangular cavity resonator 32 differs from a frequency of an attenuation pole created inside the rectangular cavity resonator 13. Thus, the polarized waveguide filter 1 shown in FIG. 18 can increase the number of attenuation poles over the polarized waveguide filter 1 shown in FIG. 2.

Note that also when the number of protrusions provided on the first wall surface 13*c* of the rectangular cavity resonator 13 differs from the number of protrusions provided on the fifth wall surface 32*c* of the second rectangular cavity resonator 32, a frequency of an attenuation pole created inside the second rectangular cavity resonator 32 differs from a frequency of an attenuation pole created inside the rectangular cavity resonator 13.

In addition, also when the dimensions of the rectangular cavity resonator 13 differ from the dimensions of the second rectangular cavity resonator 32, a frequency of an attenuation pole created inside the second rectangular cavity resonator 32 differs from a frequency of an attenuation pole created inside the rectangular cavity resonator 13.

Note that in the invention of this application, a free combination of the embodiments, modifications to any component of each of the embodiments, or omissions of any component in each of the embodiments are possible within the scope of the invention.

INDUSTRIAL APPLICABILITY

The invention is suitable for a polarized waveguide filter including rectangular waveguides and a rectangular cavity resonator, and an antenna feeding circuit.

REFERENCE SIGNS LIST

1: polarized waveguide filter, 11: first rectangular waveguide, 11*a*: incident plane, 11*b*: exit plane, 11*c*: third wall surface, 11*d*: third wall surface, 11*e*: fourth wall surface, 11*f*: fourth wall surface, 12: coupling unit, 12*a*: coupling hole, 13: rectangular cavity resonator, 13*a*: first edge surface, 13*b*, second edge surface, 13*c*: first wall surface, 13*d*: first wall surface, 13*e*: second wall surface, 13*f*: second wall surface, 14: coupling unit, 14*a*: coupling hole, 15: second rectangular waveguide, 15*a*: incident plane, 15*b*: exit plane, 15*c*: third wall surface, 15*d*: third wall surface, 15*e*: fourth wall surface, 15*f*: fourth wall surface, 16*a*, 16*b*, 16*c*, 16*d*, 16*e*, 16*f*: protrusion, 21: coupling unit, 21*a*: coupling hole, 22: external resonator, 22*a*: incident plane, 23: external resonator, 23*a*: incident plane, 23*b*: edge surface, 31: coupling unit, 31*a*: coupling hole, 32: second rectangular cavity resonator, 32*a*: third edge surface, 32*b*: fourth edge surface, 32*c*: fifth wall surface, 32*e*: sixth wall surface, 32*f*: sixth wall surface, 33: coupling unit, 33*a*: coupling hole, 34: third rectangular waveguide, 34*a*: incident plane, 34*b*: exit plane, 34*c*: seventh wall surface, 34*e*: eighth wall surface, 34*f*: eighth wall surface, and 35*a*, 35*b*: protrusion.

The invention claimed is:

1. A polarized waveguide filter comprising:

a first rectangular waveguide;

a second rectangular waveguide; and a rectangular cavity resonator to excite a TE10 mode and a TE20 mode of an electromagnetic wave, the rectangular cavity resonator having a first edge surface connected to an electromagnetic wave exit plane of the first rectangular waveguide via a coupling unit, the rectangular cavity resonator having a second edge surface connected to an electromagnetic wave incident plane of the second rectangular waveguide via a coupling unit, the second edge surface facing the first edge surface, wherein the rectangular cavity resonator has two first wall surfaces and two second wall surfaces each of which is narrower in area than the first wall surfaces, and at least one protrusion to shift a resonance frequency of the TE10 mode and a resonance frequency of the TE20 mode by respective amounts different from each other is provided on at least one of the two first wall surfaces, in such a way as to protrude outward from the rectangular cavity resonator.

2. The polarized waveguide filter according to claim 1, wherein each of the first rectangular waveguide and the second rectangular waveguide has two third wall surfaces and two fourth wall surfaces each of which is narrower in area than the third wall surfaces, and a dimension of each of the first wall surfaces in a second direction orthogonal to a first direction is longer than dimensions in the second direction of the respective third wall surfaces, the first direction being a direction orthogonal to each of the first edge surface and the second edge surface.

3. The polarized waveguide filter according to claim 2, wherein the protrusion is provided in a position in which a distance from the first edge surface is identical to a distance from the second edge surface, and in which a distance from one of edge portions in the second direction of a corresponding one of the first wall surfaces is one-quarter of a dimension in the second direction of the corresponding one of the first wall surfaces or three-fourths of the dimension in the second direction of the corresponding one of the first wall surfaces.

4. The polarized waveguide filter according to claim 2, wherein the protrusion is provided in a position in which a distance from the first edge surface is identical to a distance from the second edge surface, and in which a distance from one of edge portions in the second direction of a corresponding one of the first wall surfaces is one-half of a dimension in the second direction of the corresponding one of the first wall surfaces.

5. The polarized waveguide filter according to claim 1, wherein the at least one protrusion includes a plurality of protrusions provided on the at least one of the first wall surfaces, and dimensions of the respective protrusions in a direction in which the protrusions protrude outward from the rectangular cavity resonator differ from each other.

6. The polarized waveguide filter according to claim 1, wherein the protrusion has a cylindrical shape.

7. The polarized waveguide filter according to claim 1, wherein the protrusion has a rectangular parallelepiped shape.

8. The polarized waveguide filter according to claim 2, wherein at least one of the second wall surfaces of the rectangular cavity resonator is connected to an external resonator via a coupling unit.

9. The polarized waveguide filter according to claim 8, wherein the external resonator has a rectangular parallelepiped shape.

10. The polarized waveguide filter according to claim 8, wherein a dimension in the first direction of a first side of the external resonator is shorter than a dimension in the first direction of a second side of the external resonator, the first side being connected to a corresponding one of the second wall surfaces of the rectangular cavity resonator via the coupling unit, the second side facing the first side.

11. The polarized waveguide filter according to claim 1, comprising:

a third rectangular waveguide; and a second rectangular cavity resonator to excite the TE10 mode and the TE20 mode of the electromagnetic wave, the second rectangular cavity resonator having a third edge surface connected to an electromagnetic wave exit plane of the second rectangular waveguide via a coupling unit, the second rectangular cavity resonator having a fourth edge surface connected to an electromagnetic wave incident plane of the third rectangular waveguide via a coupling unit, the fourth edge surface facing the third edge surface, wherein the second rectangular cavity resonator has two fifth wall surfaces and two sixth wall surfaces each of which is narrower in area than the fifth wall surfaces, and at least one protrusion to shift a resonance frequency of the TE10 mode and a resonance frequency of the TE20 mode by respective amounts different from each other is provided on at least one of the two fifth wall surfaces, in such a way as to protrude outward from the second rectangular cavity resonator.

12. The polarized waveguide filter according to claim 11, wherein the third rectangular waveguide has two seventh wall surfaces and two eighth wall surfaces each of which is narrower in area than the seventh wall surfaces, and a dimension in the second direction of each of the fifth wall surfaces is longer than dimensions in the second direction of respective third wall surfaces and dimensions in the second direction of the respective seventh wall surfaces.

13. An antenna feeding circuit comprising the polarized waveguide filter according to claim 1.

* * * * *